(12) United States Patent
Takenaka et al.

(10) Patent No.: US 12,095,492 B2
(45) Date of Patent: Sep. 17, 2024

(54) RADIO FREQUENCY MODULE AND COMMUNICATION DEVICE

(71) Applicant: Murata Manufacturing Co., Ltd., Kyoto (JP)

(72) Inventors: Isao Takenaka, Kyoto (JP); Shogo Yanase, Kyoto (JP); Takayuki Oshima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 304 days.

(21) Appl. No.: 17/651,478

(22) Filed: Feb. 17, 2022

(65) Prior Publication Data

US 2022/0173759 A1  Jun. 2, 2022

Related U.S. Application Data

(63) Continuation of application No. PCT/JP2020/028626, filed on Jul. 27, 2020.

(30) Foreign Application Priority Data

Aug. 28, 2019  (JP) ................................ 2019-156028

(51) Int. Cl.
*H04B 1/38* (2015.01)
*H04B 1/03* (2006.01)
*H04B 1/04* (2006.01)
*H04B 1/12* (2006.01)

(52) U.S. Cl.
CPC ................. *H04B 1/38* (2013.01); *H04B 1/03* (2013.01); *H04B 1/04* (2013.01); *H04B 1/126* (2013.01); *H04B 2001/0408* (2013.01)

(58) Field of Classification Search
CPC ... H04B 1/38; H04B 1/03; H04B 1/04; H04B 1/126; H04B 2001/0408
See application file for complete search history.

(56) References Cited

U.S. PATENT DOCUMENTS

| 7,875,980 B2 * | 1/2011 | Imaoka | ............... H01L 23/5389 |
| | | | 257/E33.056 |
| 2013/0181786 A1 | 7/2013 | Furutani | |
| 2020/0058436 A1 * | 2/2020 | Nakagawa | .......... H01F 17/0013 |

FOREIGN PATENT DOCUMENTS

| JP | S57-94907 A | 6/1982 |
| JP | H03-278008 A | 12/1991 |
| JP | H07-131159 A | 5/1995 |
| JP | H11-112110 A | 4/1999 |
| JP | 2012-191115 A | 10/2012 |

(Continued)

OTHER PUBLICATIONS

International Search Report for PCT/JP2020/028626 dated Oct. 6, 2020.
Written Opinion for PCT/JP2020/028626 dated Oct. 6, 2020.

*Primary Examiner* — Junpeng Chen
(74) *Attorney, Agent, or Firm* — Pearne & Gordon LLP

(57) ABSTRACT

To provide a radio frequency module and a communication device capable of achieving reduction in height. The radio frequency module includes a mounting substrate and one or more chip inductors. The mounting substrate has a recess at least one end of both ends in a second direction orthogonal to a first direction that is a thickness direction of the mounting substrate. A second chip inductor that is at least one chip inductor of the one or more chip inductors is disposed in the recess.

14 Claims, 11 Drawing Sheets

(56) References Cited

FOREIGN PATENT DOCUMENTS

WO 2011/089810 A1 7/2011
WO 2018/225590 A1 12/2018

* cited by examiner

RADIO FREQUENCY MODULE AND COMMUNICATION DEVICE

CROSS REFERENCE TO RELATED APPLICATION

This is a continuation of International Application No. PCT/JP2020/028626 filed on Jul. 27, 2020, which claims priority from Japanese Patent Application No. 2019-156028 filed on Aug. 28, 2019. The contents of these applications are incorporated herein by reference in their entireties.

BACKGROUND ART

Technical Field

The present disclosure relates generally to a radio frequency module and a communication device, and more particularly to a radio frequency module and a communication device that communicate radio frequency signals.

Conventionally, a multilayer wiring board forming radio frequency radio circuits (radio frequency module) has been known (see Patent Document 1).

In Patent Document 1, the radio frequency radio circuits are formed on both surfaces of the multilayer wiring board, whereby one radio frequency radio circuit and the other radio frequency radio circuit are isolated from each other, and stable radio frequency circuits are formed without necessarily interfering with each other.

Patent Document 1: Japanese Unexamined Patent Application Publication No. 7-131159

BRIEF SUMMARY

In recent years, it has been desired to reduce the height of a radio frequency module.

The present disclosure provides a radio frequency module and a communication device capable of achieving reduction in height.

A radio frequency module according to an aspect of the present disclosure includes a mounting substrate and one or more chip inductors. The mounting substrate has a recess at at least one end of both ends in a direction orthogonal to a thickness direction. At least one chip inductor of the one or more chip inductors is disposed in the recess.

A communication device according to an aspect of the present disclosure includes the radio frequency module and a signal processing circuit. The signal processing circuit processes a signal passing through the radio frequency module.

According to the present disclosure, reduction in height can be achieved.

DETAILED DESCRIPTION

All of FIG. 1 to FIG. 16B referred to in the following embodiments and the like are schematic diagrams, and ratios of sizes and thicknesses of constituent elements in the diagrams do not necessarily reflect actual dimensional ratios.

Embodiment 1

Hereinafter, a radio frequency module 1 and a communication device 500 according to the present embodiment will be described with reference to FIG. 1 to FIG. 4C.

(1) Overall Configuration of Radio Frequency Module

The radio frequency module 1 according to the embodiment is used in, for example, a communication device 500 adaptive to multimode/multiband. The communication device 500 is, for example, a mobile phone (for example, a smartphone), but is not limited thereto, and may be, for example, a wearable terminal (for example, a smartwatch) or the like.

The radio frequency module 1 is provided in the communication device 500 that is adaptive to multiband and that conforms to a communication standard such as long term evolution (LTE), for example. The radio frequency module 1 can achieve bidirectional transmission of full-duplex communication by assigning different frequencies to a transmission signal (a radio frequency signal for transmission) and a reception signal (a radio frequency signal for reception) by, for example, frequency division duplex (FDD).

(2) Constituent Elements of Communication Device

Figure 1:
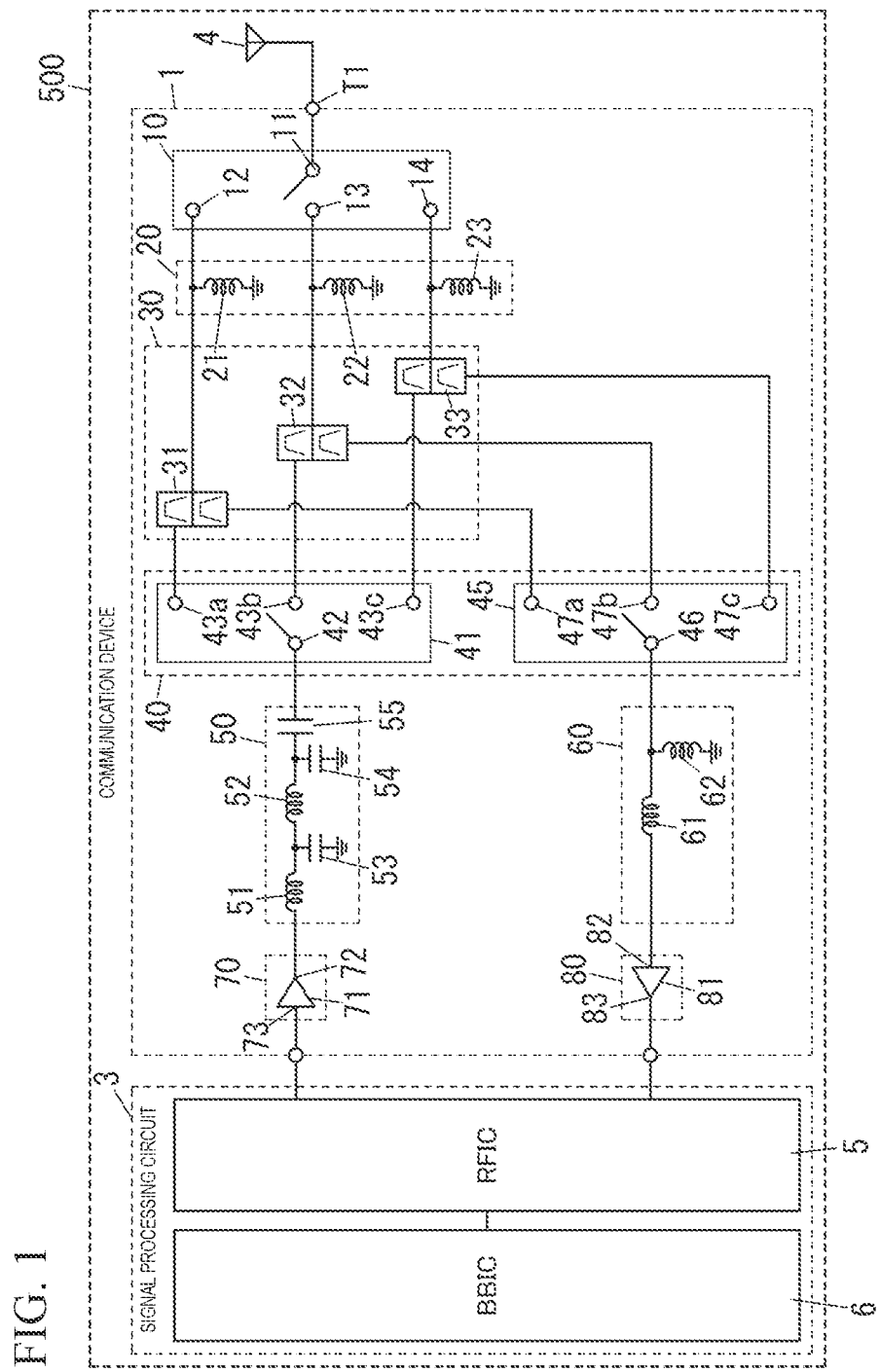
FIG. 1 is a schematic circuit diagram for explaining a communication device including a radio frequency module according to Embodiment 1.

As illustrated in FIG. 1, the communication device 500 includes a radio frequency module 1, an antenna 4, and a signal processing circuit 3. The communication device 500 transmits and receives signals through the antenna 4. In the present embodiment, a frequency band of a signal (transmission signal) to be transmitted through the antenna 4 and a frequency band of a signal (reception signal) to be received through the antenna 4 are in the same band.

Figure 2:
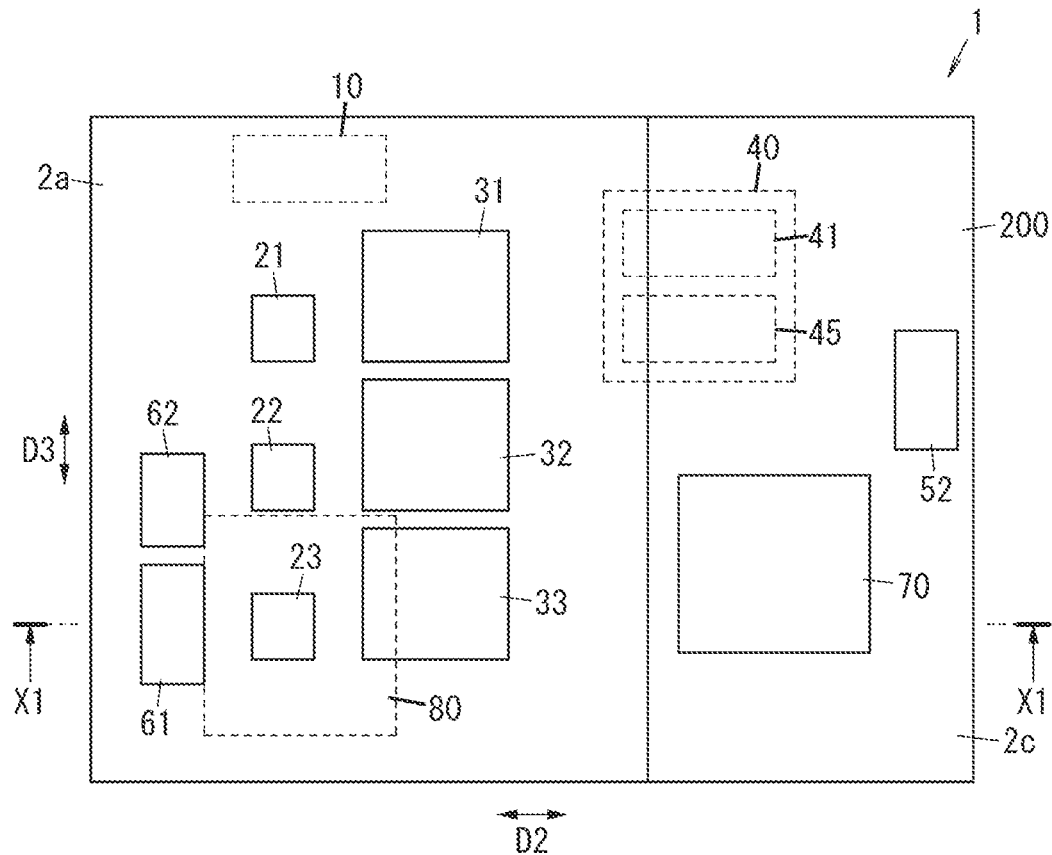
FIG. 2 is a schematic plan view for explaining a configuration of the above-described radio frequency module.
Figure 3:
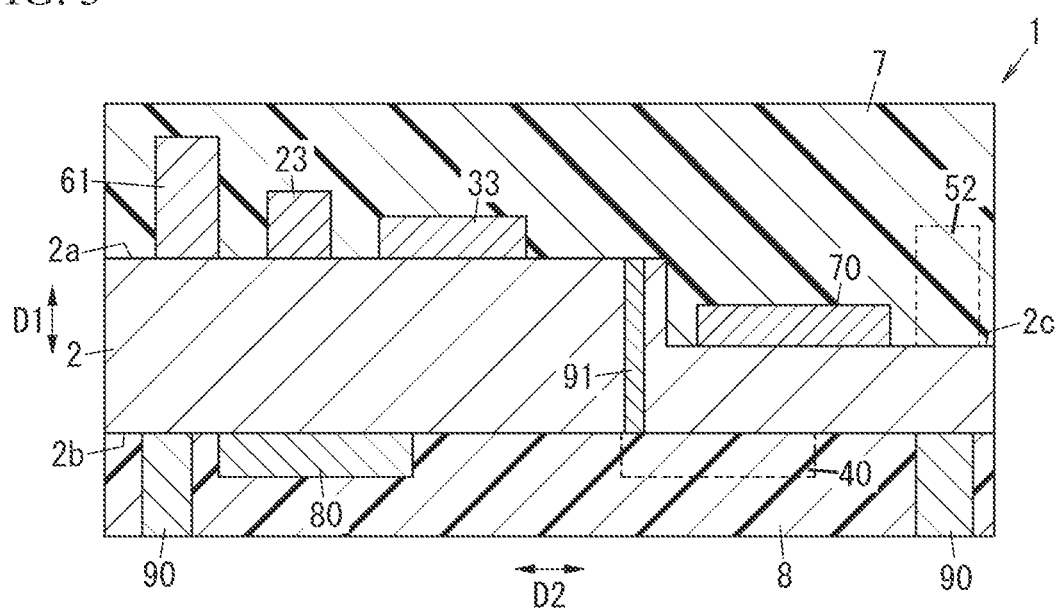
FIG. 3 is an X1-X1 cross-sectional view of FIG. 2.

As illustrated in FIG. 1 to FIG. 3, the radio frequency module 1 according to the present embodiment includes a mounting substrate 2, an antenna switch 10, a first matching circuit unit 20, a filter group 30, a switch unit 40, a second matching circuit unit 50, a third matching circuit unit 60, a first amplification unit 70, and a second amplification unit 80.

The mounting substrate 2 has a first main surface 2a and a second main surface 2b that are opposed to each other in a first direction D1 that is a thickness direction of the mounting substrate 2. The mounting substrate 2 is, for example, a printed wiring board, low temperature co-fired ceramics (LTCC), high temperature co-fired Ceramics (HTCC), or a resin substrate. Here, the mounting substrate 2 is, for example, a multilayer substrate including a plurality of dielectric layers and a plurality of conductive layers. The plurality of dielectric layers and the plurality of conductive layers are laminated in the first direction D1 of the mounting substrate 2. The plurality of conductive layers is formed in a predetermined pattern determined for each layer. Each of the plurality of conductive layers includes one or a plurality of conductor portions in one plane orthogonal to the first direction D1 of the mounting substrate 2. A material of each conductive layer is, for example, copper. The plurality of conductive layers includes a ground layer. In the radio frequency module 1, the plurality of ground terminals and the ground layer are electrically connected to each other through a via conductor 91 or the like included in the mounting substrate 2.

The mounting substrate 2 is not limited to a printed wiring board or an LTCC substrate, and may be a wiring structure. The wiring structure is, for example, a multilayer structure. The multilayer structure includes at least one insulating layer and at least one conductive layer. The insulating layer is formed in a predetermined pattern. When there is a plurality of insulating layers, the plurality of insulating layers is formed in a predetermined pattern determined for each layer. The conductive layer is formed in a predetermined pattern different from the predetermined pattern of the insulating layer. When there is a plurality of conductive layers, the plurality of conductive layers is formed in a predetermined pattern determined for each layer. The conductive layer may include one or more rewiring portions. In the wiring structure, a first surface of two surfaces opposed to each other in the thickness direction of the multilayer structure is the first main surface 2a of the mounting substrate 2, and a second surface is the second main surface 2b of the mounting substrate 2. The wiring structure may be, for example, an interposer. The interposer may be an interposer using a silicon substrate, or may be a substrate formed of multiple layers.

The mounting substrate 2 is provided with a recess 200 with respect to the first main surface 2a at at least one end of both ends in a second direction D2 orthogonal to the first direction D1. In the present embodiment, the recess 200 is provided at one end of the both ends in the second direction D2 with respect to the first main surface 2a. Components constituting the radio frequency module 1 are provided on the first main surface 2a, the second main surface 2b, and a surface 2c of the recess 200. For example, the first matching circuit unit 20 and filters 31 to 33 included in the filter group 30 are provided on the first main surface 2a. The switch unit 40 and the second amplification unit 80 are provided on the second main surface 2b. The first amplification unit 70 and a chip inductor (inductor 52) included in the second matching circuit unit 50 are provided on the surface 2c of the recess 200. Each component provided on the first main surface 2a, the second main surface 2b, and the surface 2c of the recess 200 is electrically connected to the mounting substrate 2 by using, for example, a solder bump. The solder bump is disposed between the mounted component and the mounting substrate 2 in the thickness direction (first direction D1) of the mounting substrate 2. Note that in FIG. 3, the solder bumps are omitted.

The antenna switch 10 is connected to the antenna 4. The antenna switch 10 is, for example, a switch integrated circuit (IC). Specifically, the antenna switch 10 includes a common terminal 11 and a plurality of (three in the illustrated example) selection terminals (a first selection terminal 12, a second selection terminal 13, and a third selection terminal 14) (see FIG. 1). The common terminal 11 is connected to an antenna terminal T1 connected to the antenna 4. The antenna switch 10 switches a connection state between the common terminal 11 and the first selection terminal 12, the second selection terminal 13, and the third selection terminal 14. The antenna switch 10 is a switch that switches among a first state in which the common terminal 11 and the first selection terminal 12 are connected, a second state in which the common terminal 11 and the second selection terminal 13 are connected, and a third state in which the common terminal 11 and the third selection terminal 14 are connected.

The first selection terminal 12 is connected to the filter 31 included in the filter group 30. The second selection terminal 13 is connected to the filter 32 included in the filter group 30. The third selection terminal 14 is connected to the filter 33 included in the filter group 30. In the radio frequency module, the antenna switch 10 can switch among the first state, the second state, and the third state.

The antenna switch 10 is controlled by, for example, the signal processing circuit 3. The antenna switch 10 electrically connects any one of the first selection terminal 12, the second selection terminal 13, and the third selection terminal 14 to the common terminal 11 in accordance with a control signal from an RF signal processing circuit 5 in the signal processing circuit 3.

The first matching circuit unit 20 includes, for example, a plurality of (three in the illustrated example) chip inductors 21 to 23 (see FIG. 1). Each of the chip inductors 21 to 23 is a circuit element that performs impedance matching between the antenna switch 10 and the filter group 30. The chip inductors 21 to 23 have one end respectively connected to paths connecting the antenna switch 10 and the filters 31 to 33 included in the filter group 30, and the other end connected to a reference terminal (ground). Note that in the first matching circuit unit 20, the chip inductors 21 to 23 may be connected in series to the above-described path instead of being respectively connected between the above-described paths and the ground. Furthermore, the first matching circuit unit 20 is not limited to the chip inductors 21 to 23, and may be a capacitor or a circuit in which an inductor and a capacitor are combined. In the present embodiment, the chip inductors 21 to 23 may be referred to as first chip inductors 21 to 23.

The filter group 30 includes a plurality of filters 31 to 33 (see FIG. 1). The plurality of filters 31 to 33 is, for example, an acoustic wave filter, and each of a plurality of series arm resonators and a plurality of parallel arm resonators is configured of an acoustic wave resonator. The acoustic wave filter is, for example, a surface acoustic wave (SAW) filter using a surface acoustic wave. Note that the plurality of filters 31 to 33 is not limited to a SAW filter. The plurality of filters may be, for example, a bulk acoustic wave (BAW) filter other than the SAW filters. Alternatively, the plurality of filters 31 to 33 may be configured of a film bulk acoustic resonator (FBAR) or the like. Further, the filters 31 to 33 may be configured of LC resonance circuits or the like.

The filters 31 to 33 are duplexers. Each of the filters 31 to 33 is connected one-to-one to a plurality of selection terminals of the antenna switch 10. Each of the filters 31 to 33 is connected one-to-one to a plurality of (three in the illustrated example) selection terminals of a first switch 41 of the switch unit 40. Each of the filters 31 to 33 is connected one-to-one to a plurality of (three in the illustrated example) selection terminals of a second switch 45 of the switch unit 40.

The switch unit 40 is, for example, a switch IC. The switch unit 40 includes the first switch 41 and the second switch 45 (see FIG. 1).

The first switch 41 includes a common terminal 42 and a plurality of (three in the illustrated example) selection terminals 43a to 43c. The first switch 41 switches a connection state between the common terminal 42 and the selection terminals 43a to 43c. The common terminal 42 is connected to the first amplification unit 70. Specifically, the common terminal 42 is connected to the first amplification unit 70 with the second matching circuit unit 50 interposed therebetween. The plurality of selection terminals 43a to 43c is connected one-to-one to the plurality of filters included in the filter group 30. In the present embodiment, the selection terminal 43a is connected to the filter 31, the selection terminal 43b is connected to the filter 32, and the selection terminal 43c is connected to the filter 33. The first switch 41 electrically connects any one of the selection terminals 43a to 43c to the common terminal 42 in accordance with a control signal from the RF signal processing circuit 5 in the signal processing circuit 3.

The second switch 45 includes a common terminal 46 and a plurality of (three in the illustrated example) selection terminals 47a to 47c. The second switch 45 switches a connection state between the common terminal 46 and the selection terminals 47a to 47c. The common terminal 46 is connected to the second amplification unit 80. Specifically, the common terminal 46 is connected to the second amplification unit 80 with the third matching circuit unit 60 interposed therebetween. The plurality of selection terminals 47a to 47c is connected one-to-one to the plurality of filters included in the filter group 30. In the present embodiment, the selection terminal 47a is connected to the filter 31, the selection terminal 47b is connected to the filter 32, and the selection terminal 47c is connected to the filter 33. The second switch 45 electrically connects any one of the selection terminals 47a to 47c to the common terminal 46 in accordance with a control signal from the RF signal processing circuit 5 in the signal processing circuit 3.

The second matching circuit unit 50 includes, for example, a plurality of (two in the illustrated example) inductors 51 and 52 and a plurality of (three in the illustrated example) capacitors 53 to 55. The inductors 51 and 52 are circuit elements that perform impedance matching between the first switch 41 and the first amplification unit 70.

The inductor 51 is formed by a wiring pattern. One end of the inductor 51 is connected to an output terminal 72 of a power amplifier 71 included in the first amplification unit 70. The other end of the inductor 51 is connected to the common terminal 46 of the second switch 45 in the switch unit 40.

The inductor 52 is a chip inductor formed of a coil. One end of the inductor 52 is connected to an output side of the power amplifier 71. Specifically, one end of the inductor 52 is connected to the output terminal 72 of the power amplifier 71 with the inductor 51 interposed therebetween. The other end of the inductor 52 is connected to the common terminal 42 of the first switch 41. Note that in the following description, the inductor 52 may be referred to as a second chip inductor 52.

One end of the capacitor 53 is connected to a path between the inductor 51 and the inductor 52. The other end of the capacitor 53 is connected to a reference terminal (ground). One end of the capacitor 54 is connected to a path between the inductor 52 and the common terminal 42. The other end of the capacitor 54 is connected to a reference terminal (ground). The capacitor 54 is provided between the inductor 52 and the common terminal 42. Specifically, the capacitor 54 is provided between the common terminal 42 and a contact point between the capacitor 53 and a path between the inductor 52 and the common terminal 42. One end of the capacitor 55 is connected to the inductor 52. The other end of the capacitor 55 is connected to the common terminal 42. In this case, one end of the capacitor 54 is connected to a path between the inductor 52 and the capacitor 55.

The third matching circuit unit 60 includes, for example, a plurality of (two in the illustrated example) chip inductors 61 and 62. The chip inductors 61 and 62 are circuit elements that perform impedance matching between the second switch 45 and the second amplification unit 80. One end of the chip inductor 61 is connected to an input side of a low noise amplifier 81 included in the second amplification unit 80. Specifically, one end of the chip inductor 61 is connected to an input terminal 82 of the low noise amplifier 81. The other end of the chip inductor 61 is connected to the common terminal 46 of the second switch 45. One end of the chip inductor 62 is connected to a path between the chip inductor 61 and the common terminal 46. That is, one end of the chip inductor 62 is connected to an input side of the low noise amplifier 81 with the chip inductor 61 interposed therebetween. The other end of the chip inductor 62 is connected to a reference terminal (ground). In the following description, the chip inductors 61 and 62 may be referred to as third chip inductors 61 and 62.

The first amplification unit 70 is a power amplifier IC including a power amplifier 71. The power amplifier 71 amplifies a signal (transmission signal) to be transmitted from the antenna 4. An input terminal 73 of the power amplifier 71 is connected to the signal processing circuit 3. The output terminal 72 of the power amplifier 71 is connected to the second matching circuit unit 50. The power amplifier 71 amplifies a signal output from the signal processing circuit 3. The power amplifier 71 outputs the amplified transmission signal to the first switch 41 with the second matching circuit unit 50 interposed therebetween.

The second amplification unit 80 is a low noise amplifier IC including the low noise amplifier 81. The low noise amplifier 81 amplifies a signal (reception signal) received by the antenna 4. The input terminal 82 of the low noise amplifier 81 is connected to the third matching circuit unit 60. The output terminal 83 of the low noise amplifier 81 is connected to the signal processing circuit 3. The low noise amplifier 81 amplifies a signal (reception signal) that has passed through any one of the filters 31 to 33 and the third matching circuit unit 60. The low noise amplifier 81 outputs the amplified reception signal to the signal processing circuit 3.

The signal processing circuit 3 processes a signal passing through the radio frequency module 1. The signal processing circuit 3 includes, for example, the RF signal processing circuit 5 and a baseband signal processing circuit 6. The RF signal processing circuit 5 is, for example, a radio frequency integrated circuit (RFIC), and performs signal processing on a radio frequency signal. The baseband signal processing circuit 6 is, for example, a baseband integrated circuit (BBIC), and performs predetermined signal processing. The reception signal processed by the baseband signal processing circuit 6 is used, for example, for image display as an image signal or for a telephone call as an audio signal. The radio frequency module 1 transmits a radio frequency signal (here, a transmission signal and a reception signal) between the antenna 4 and the RF signal processing circuit 5 in the signal processing circuit 3. In the communication device 500, the baseband signal processing circuit 6 is an optional constituent element.

In the present embodiment, the radio frequency module 1 includes, as chip inductors, a chip inductor for choke included in the power amplifier 71, a chip inductor included in the low noise amplifier 81, and a chip inductor included in each of the filters 31 to 33, in addition to the third chip inductors 61 and 62, the first chip inductors 21 to 23, and the second chip inductor 52. When the chip inductors included in the radio frequency module 1 are arranged, the third chip inductors 61 and 62 and the second chip inductor 52 have the highest height in the first direction D1 among the chip inductors. Additionally, among these chip inductors, the first chip inductors 21 to 23 have the lowest height.

Next, the arrangement of the first chip inductors 21 to 23, the second chip inductor 52, the third chip inductors 61 and 62, and other constituent elements in the radio frequency module 1 will be described.

FIG. 2 is a plan view of the radio frequency module 1 in a view from the first direction D1, and FIG. 3 is a cross-sectional view of the radio frequency module 1.

The radio frequency module 1 includes a plurality of external connection electrodes 90 (see FIG. 3). The plurality of external connection electrodes 90 connects the radio frequency module 1 to a motherboard on which the signal processing circuit 3 and the like are mounted. The plurality of external connection electrodes 90 is a columnar (for example, cylindrical) electrode provided on the second main surface 2b of the mounting substrate 2. A material of the plurality of external connection electrodes 90 is, for example, metal (for example, copper, a copper alloy, or the like). The plurality of external connection electrodes 90 includes the antenna terminal T1 and a ground terminal to be used for grounding.

The radio frequency module 1 receives a signal received by the antenna 4 through the antenna terminal T1 that is one external connection electrode 90 of the plurality of external connection electrodes 90, and outputs the signal to the RF signal processing circuit 5 in the signal processing circuit 3 through another external connection electrode 90.

The radio frequency module 1 further includes, on the first main surface 2a of the mounting substrate 2, a first resin layer 7 that covers electronic components, such as the filters 31 to 33 mounted on the first main surface 2a. The radio frequency module 1 further includes, on the second main surface 2b of the mounting substrate 2, a second resin layer 8 that covers electronic components, such as the switch unit 40 and a low noise amplifier IC serving as the second amplification unit 80 that are mounted on the second main surface 2b. A material of the second resin layer 8 may be the same as or different from the material of the first resin layer 7. Note that in FIG. 2, the first resin layer 7 is omitted.

As described above, the antenna switch 10, the switch unit 40, and the second amplification unit 80 are disposed on the second main surface 2b of the mounting substrate 2 (see FIG. 3). When viewed from the third direction D3 orthogonal to both the first direction D1 and the second direction D2, the switch unit 40 and the second amplification unit 80 are disposed along the second direction D2 (see FIG. 3). The antenna switch 10 and the switch unit 40 are disposed along the third direction D3 (see FIG. 2).

The first chip inductors 21 to 23 are disposed on the first main surface 2a of the mounting substrate 2 along the third direction D3 (see FIG. 2). The first chip inductors 21 to 23 are connected to the antenna switch 10.

The filters 31 to 33 are disposed on the first main surface 2a of the mounting substrate 2 along the third direction D3 (see FIG. 2). The filters 31 to 33 are connected one-to-one to the first chip inductors 21 to 23. The filters 31 to 33 and the first chip inductors 21 to 23 to be connected are disposed along the second direction D2. This makes it possible to shorten a distance between the filters 31 to 33 and the first chip inductors 21 to 23 to be connected. Further, the filters 31 to 33 are connected to both the first switch 41 and the second switch 45 of the switch unit 40.

The third chip inductors 61 and 62 are disposed, among both end portions of the first main surface 2a in the second direction D2, at the end portion being far from the recess 200. In the present embodiment, the third chip inductors 61 and 62 are disposed on the first main surface 2a along the third direction D3. The third chip inductors 61 and 62 are connected to the second switch 45. The third chip inductor 61 is connected to the low noise amplifier 81.

Note that the third chip inductors 61 and 62 may be disposed on the first main surface 2a along the second direction D2. In this case, both of the third chip inductors 61 and 62 are disposed at the opposite side to the recess 200 with respect to the first chip inductors 21 to 23.

The second chip inductor 52 and the power amplifier IC serving as the first amplification unit 70 are disposed in the recess 200. That is, the second chip inductor 52 and the power amplifier IC serving as the first amplification unit 70 are disposed on the surface 2c of the recess 200 (see FIG. 3). That is, in the recess 200, a chip inductor (the second chip inductor 52) having a height higher than heights of other chip inductors (the first chip inductors 21 to 23) disposed in a region different from the recess 200 is disposed.

The second chip inductor 52 is disposed at an end portion of the mounting substrate 2 in the second direction D2. The second chip inductor 52 is connected to the first switch 41. The first amplification unit 70 is disposed at an inner side than the second chip inductor 52 when viewed from the third direction D3.

Additionally, the second amplification unit 80 including the low noise amplifier 81 disposed on the second main surface 2b is disposed at a position not overlapping the first amplification unit 70 including the power amplifier 71 in plan view in the first direction D1 of the mounting substrate 2 (see FIG. 2 and FIG. 3).

The output terminal 72 of the power amplifier 71 in the first amplification unit 70 is connected to the second chip inductor 52 with the inductor 51 formed by a wiring pattern interposed therebetween. The input terminal 73 of the power amplifier 71 is connected to the signal processing circuit 3.

In the mounting substrate 2, the via conductor 91 (through electrode) that is connected to the ground terminal among the plurality of external connection electrodes 90 to be used as a ground potential is formed along the first direction D1 at an end portion close to the recess 200 among both end portions of the first main surface 2a in the second direction D2 (see FIG. 3). Note that in FIG. 3, a connection destination of the via conductor 91 is omitted. The via conductor 91 is disposed between the recess 200 and the second amplification unit 80 including the low noise amplifier in plan view in the first direction D1 (see FIG. 3).

In the present embodiment, the first chip inductors 21 to 23, the second chip inductor 52, and the third chip inductors 61 and 62 are arranged in this order from the left along the second direction D2 on the mounting substrate 2 (see FIG. 3). Further, the second chip inductor 52 is disposed in the recess 200.

Note that the chip inductor disposed in the recess 200 is not limited to the second chip inductor 52. The chip inductor disposed in the recess 200 may be at least one third chip inductor of the third chip inductors 61 and 62. Alternatively, the chip inductor disposed in the recess 200 may be at least one first chip inductor of the first chip inductors 21 to 23. Alternatively, the chip inductor disposed in the recess 200 may be a chip inductor different from the third chip inductors 61 and 62, the first chip inductors 21 to 23, and the second chip inductor 52. Alternatively, the chip inductors disposed in the recess 200 may be two or more chip inductors of these chip inductors.

Additionally, in the radio frequency module 1, one inductor chip may be disposed in the recess 200 provided in the mounting substrate 2 among the first chip inductors 21 to 23, the second chip inductor 52, and the third chip inductors 61 and 62, and the other inductor chips may be disposed in a region other than the recess 200.

For example, among the first chip inductors 21 to 23, the second chip inductor 52, and the third chip inductors 61 and 62, the second chip inductor 52 may be disposed in the recess 200, and the third chip inductors 61 and 62 may be disposed in a region other than the recess 200. Conversely, among the first chip inductors 21 to 23, the second chip inductor 52, and the third chip inductors 61 and 62, the third chip inductors 61 and 62 may be disposed in the recess 200, and the second chip inductor 52 may be disposed in a region other than the recess 200.

Alternatively, among the first chip inductors 21 to 23, the second chip inductor 52, and the third chip inductors 61 and 62, the second chip inductor 52 may be disposed in the recess 200, and the first chip inductors 21 to 23 may be disposed in a region other than the recess 200. Conversely, among the first chip inductors 21 to 23, the second chip inductor 52, and the third chip inductors 61 and 62, the first chip inductors 21 to 23 may be disposed in the recess 200, and the second chip inductor 52 may be disposed in a region other than the recess 200.

Alternatively, among the first chip inductors 21 to 23, the second chip inductor 52, and the third chip inductors 61 and 62, the third chip inductors 61 and 62 may be disposed in the recess 200, and the first chip inductors 21 to 23 may be disposed in a region other than the recess 200. Conversely, among the first chip inductors 21 to 23, the second chip inductor 52, and the third chip inductors 61 and 62, the first chip inductors 21 to 23 may be disposed in the recess 200, and the third chip inductors 61 and 62 may be disposed in a region other than the recess 200.

A manufacturing process of the mounting substrate 2 includes cutting with a dicing machine. The cutting process with a dicing machine is a process of cutting a motherboard including a plurality of mounting substrates into individual mounting substrates with a diamond blade rotating at high speed.

In the present embodiment, for example, the cutting with the dicing machine is performed on a mother substrate 1000 (see FIG. 4A) in which seven mounting substrates 2 are arranged in the second direction D2 and seven mounting substrates 2 are arranged in the third direction D3 regarding a plurality of mounting substrates 2. Here, in the cutting with the dicing machine of the present embodiment, there is a process of forming the recess 200 in addition to the conventional process. The recess 200 is formed in each mounting substrate 2 along the third direction D3. In the mother substrate 1000, cutting positions 1010 to 1015 for cutting the mother substrate 1000 into each mounting substrate 2 in the third direction D3 are present along the second direction D2. Also, in the mother substrate 1000, cutting positions 1020 to 1025 for cutting the mother substrate 1000 into each mounting substrate 2 in the second direction D2 are present along the second direction D2.

In the mother substrate 1000, a portion where the recesses 200 are formed and a portion where the recesses are not formed are alternately set for the cutting positions 1010 to 1015. For example, the recesses 200 are formed at the cut positions 1010, 1012, and 1014, and the recesses 200 are not formed at the other cutting positions.

A plurality of (49 in the illustrated example) mounting substrates 2 is formed by cutting the mother substrate 1000 at the cutting positions 1010, 1011, 1012, 1013, 1014, and 1015 and further cutting the mother substrate 1000 at the cutting positions 1020, 1021, 1022, 1023, 1024, and 1025. In this case, for example, by cutting the mother substrate 1000 into each mounting substrate 2 at the cutting positions 1010, 1012, and 1014, the connected recesses 200 in each of the adjacent mounting substrate 2 are cut. Note that, depending on the number of the mounting substrates 2 arranged in the second direction D2, the recesses 200 are also formed at one end of the mother substrate 1000 in a lateral direction (the second direction D2) (see FIG. 4A).

In addition, a wiring pattern, the electronic components, and the like that are provided on each of the mounting substrates 2 are disposed so as to be symmetrical with respect to the two mounting substrates 2 adjacent to each other with the two connected recesses 200 interposed therebetween, with the cutting position serving as a reference.

Figure 4A:
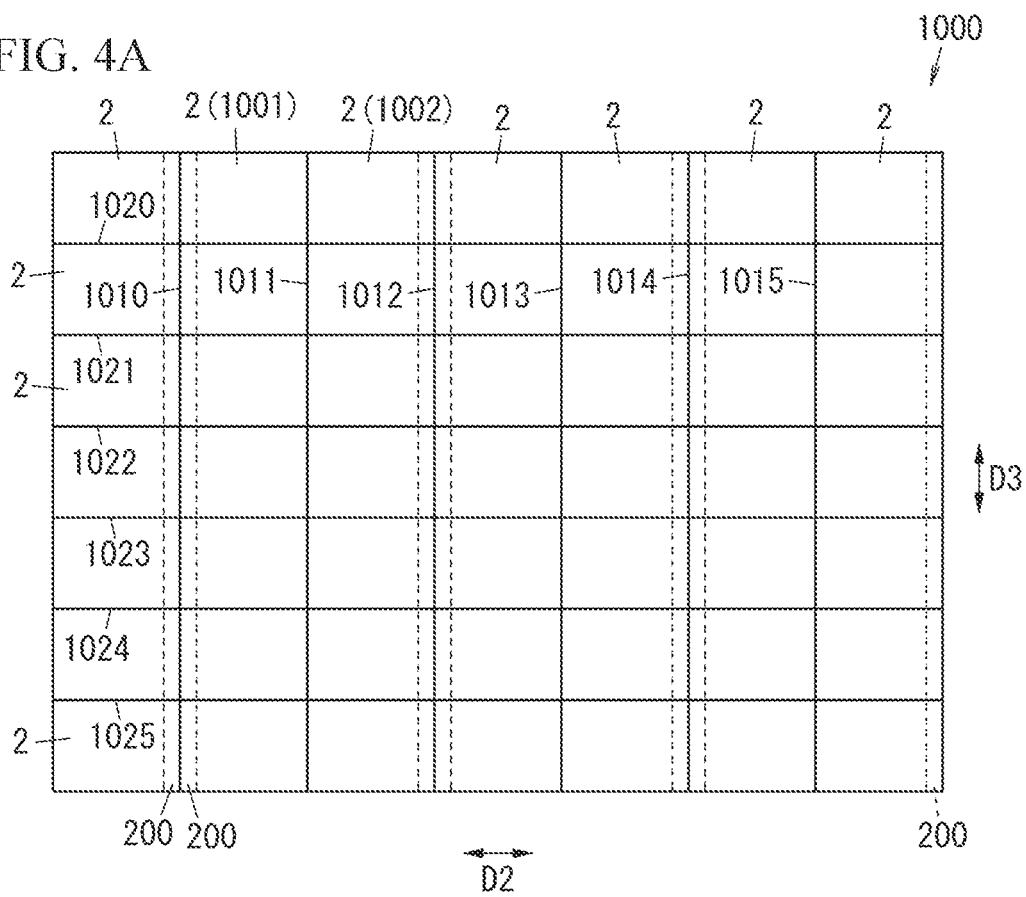
FIG. 4A is a diagram for explaining a mother substrate that includes mounting substrates of the above-described radio frequency modules and that is cut with a dicing machine.
Figure 4B:
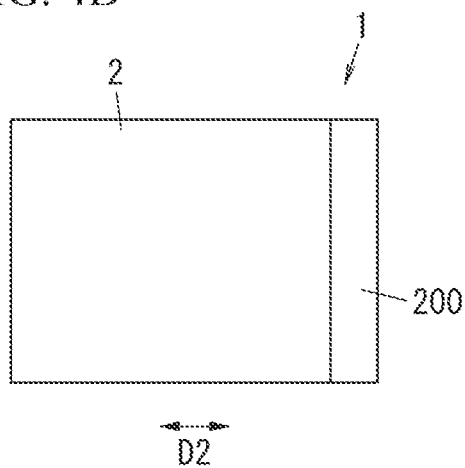
FIG. 4B is a plan view of the above-described mounting substrate formed by being cut with the dicing machine.
Figure 4C:
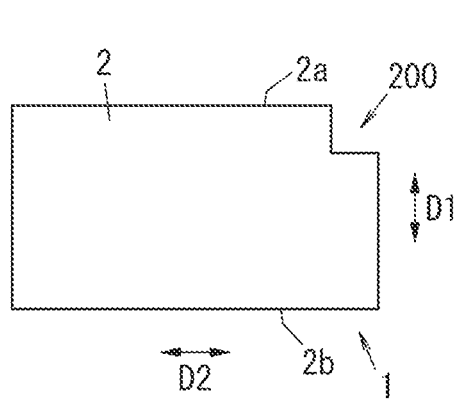
FIG. 4C is a side view of the above-described mounting substrate in a view from a third direction.

The recess 200 is formed at one end in the second direction D2 by cutting with the dicing machine, and is provided with respect to the first main surface 2a (see FIG. 4B and FIG. 4C). Note that in FIG. 4B and FIG. 4C, components such as the antenna switch 10 disposed on the mounting substrate 2 are omitted.

(3) Effects

As described above, in the present embodiment, the radio frequency module 1 includes the mounting substrate 2 having a plate shape or a layered shape and one or more chip inductors (for example, the third chip inductors 61 and 62, the first chip inductors 21 to 23, the second chip inductor 52, and the like). The mounting substrate 2 has the recess 200 at at least one end of both ends in the second direction D2 that is a direction orthogonal to the first direction D1 that is a thickness direction. At least one chip inductor of the one or more chip inductors is disposed in the recess 200.

According to this configuration, the mounting substrate 2 has the recess 200 at at least one end of the both ends in the second direction D2. Thus, by disposing an electronic component (for example, a chip inductor) in the recess 200, the height of the radio frequency module 1 can be reduced.

Additionally, in order to reduce the height, a recess may be provided in the central portion of the mounting substrate. In this case, it is suitable to form a concave portion in the central portion of the mounting substrate in order to provide the recess in the central portion of the mounting substrate. In order to provide the recess in the central portion of the mounting substrate, it is suitable to form the concave portion in the central portion of a daughter substrate by drilling or laser processing.

On the other hand, in the present embodiment, in order to provide the recess 200 at at least one end of the both ends in the second direction D2, the recesses 200 may be provided along the cutting positions 1010 to 1015 of the mother substrate 1000 in cutting with the dicing machine. This process can be performed easily compared with the case where a concave portion is formed in the central portion of the mounting substrate.

Thus, as compared with the case where a concave portion is formed in the central portion of the mounting substrate, the height can be easily reduced.

In addition, in the case where a concave portion is formed in the central portion of the mounting substrate, when a size of the concave portion is small, there is a possibility that a jig holding an electronic component abuts on an edge of the concave portion and the electronic component cannot be disposed on a surface of the concave portion. Thus, it is suitable to consider a size of a jig to be used when an electronic component is provided in the concave portion. For example, it is suitable to consider that the jig does not abut at the both ends in the second direction D2. That is, when the concave portion is formed in the central portion of the mounting substrate, for example, in addition to a space in which the electronic component is provided, a further space needs to be provided so that the jig does not abut at the both ends in the second direction D2 in the concave portion.

On the other hand, in the present embodiment, in order to provide the recess 200 at at least one end of the both ends in the second direction D2, for example, it is suitable to consider that the jig does not abut at only one end in the second direction D2, but it is optional to consider abutting at the other end in the second direction. That is, in order to provide the recess 200, it is optional to provide a further space so that the jig does not abut at the other end in the second direction D2. Thus, the size of the mounting substrate 2 can be reduced in the second direction D2 as compared with the case where the concave portion is formed in the central portion of the mounting substrate.

Further, in the present embodiment, the second chip inductor 52 is disposed in the recess 200, and the first chip inductors 21 to 23 are disposed in a region other than the recess 200, for example, on the first main surface 2a. That is, the height of one chip inductor (second chip inductor 52) disposed in the recess 200 is higher than the heights of other chip inductors (first chip inductors 21 to 23) disposed in a region different from the recess 200.

Thus, the height of the radio frequency module 1 can be reduced.

(4) Modifications

Modifications will be listed below. Note that modifications that will be described below can be applied in combination with the above embodiment as appropriate.

(4-1) Modification 1

In the radio frequency module 1 according to the above-described embodiment, the mounting substrate 2 has a configuration in which the recess 200 is provided with respect to the first main surface 2a at one end of the both ends in the second direction D2, but is not limited to this configuration.

Recesses may be provided with respect to the first main surface 2a at the both ends of the mounting substrate in the second direction D2.

Alternatively, a recess may be provided at one end of the mounting substrate in the second direction D2 with respect to the second main surface 2b.

Alternatively, recesses may be provided with respect to the second main surface 2b at the both ends of the mounting substrate in the second direction D2.

Hereinafter, the case where recesses are provided with respect to the second main surface 2b at the both ends of the mounting substrate in the second direction D2 will be described with reference to FIG. 5 and FIG. 6. Note that constituent elements similar to those in Embodiment 1 are denoted by the same reference signs, and description thereof is appropriately omitted.

A circuit configuration of a radio frequency module 1A according to the present modification is the same as the circuit configuration of the radio frequency module 1 according to Embodiment 1.

Figure 5:
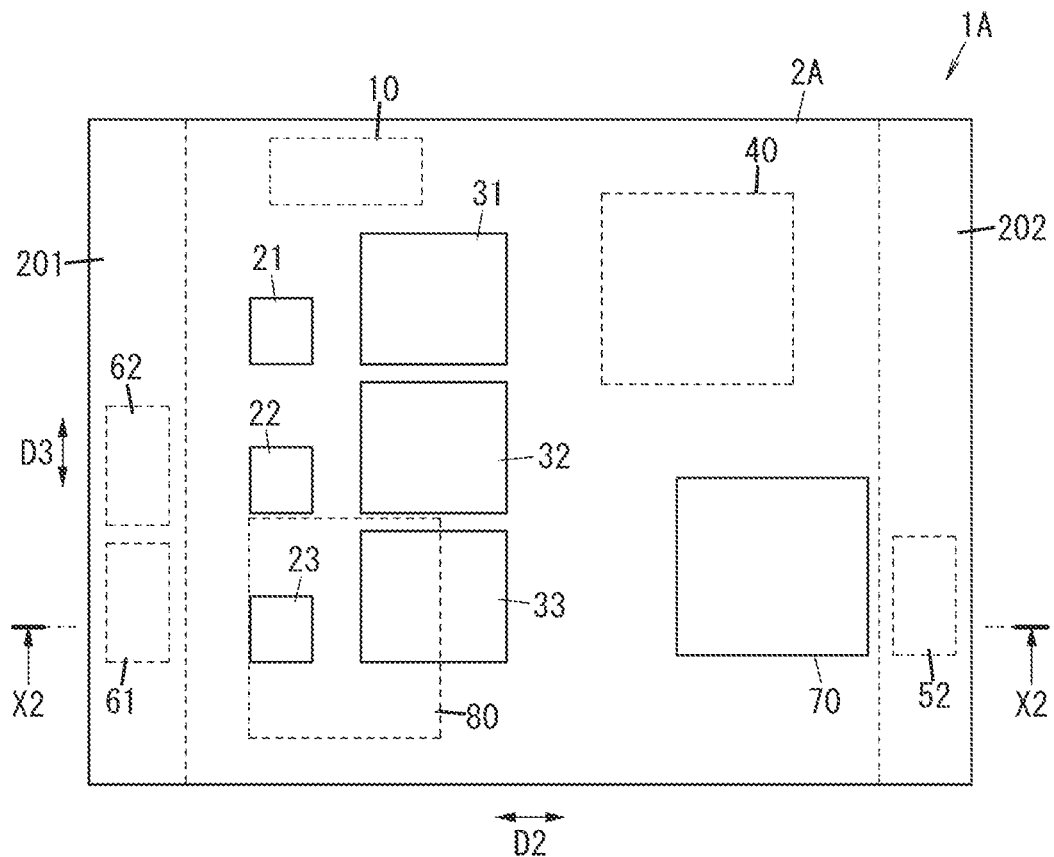
FIG. 5 is a schematic plan view for explaining a configuration of a radio frequency module according to Modification 1 of Embodiment 1.
Figure 6:
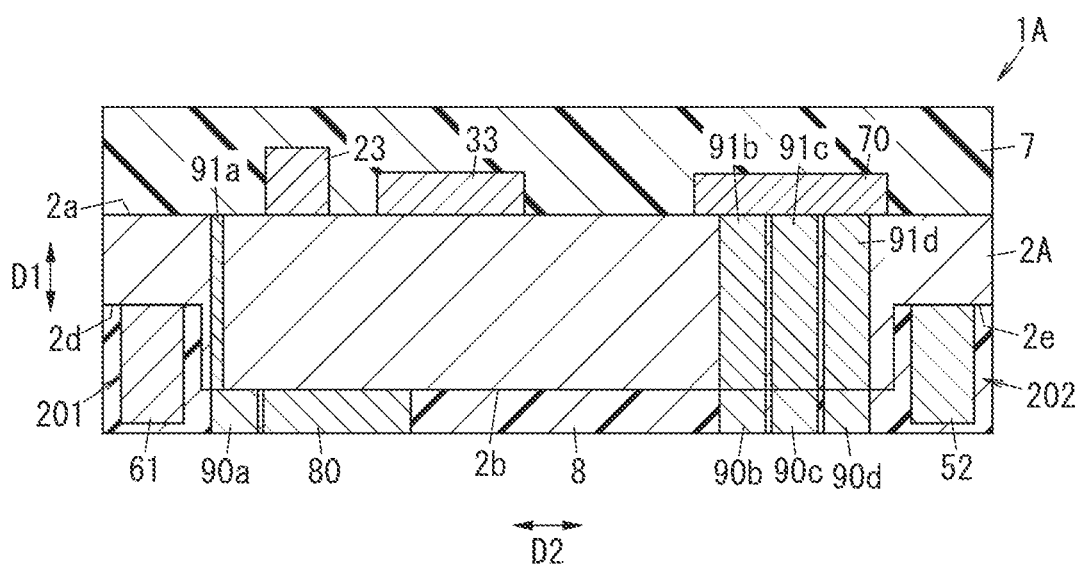
FIG. 6 is an X2-X2 cross-sectional view of FIG. 5.
Figure 7A:
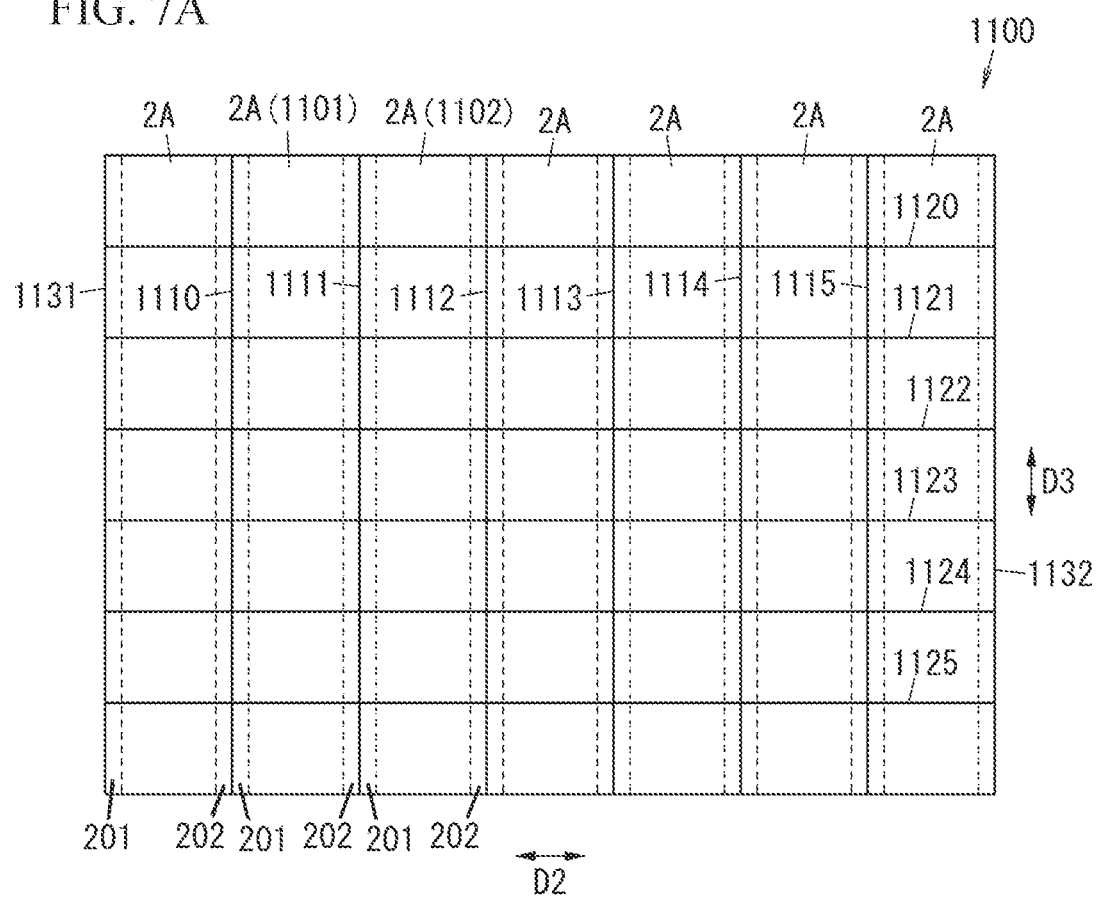
FIG. 7A is a diagram for explaining a mother substrate that includes mounting substrates of the above-described radio frequency modules and that is cut with a dicing machine.
Figure 7B:
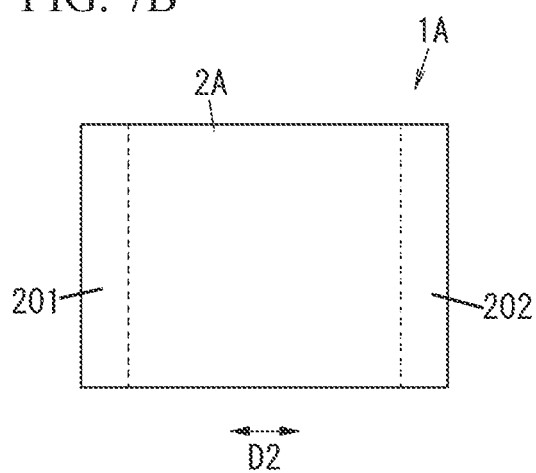
FIG. 7B is a plan view of the above-described mounting substrate formed by being cut with the dicing machine.
Figure 7C:
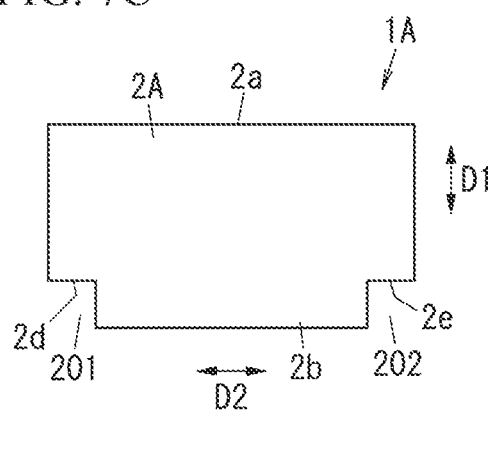
FIG. 7C is a side view of the above-described mounting substrate in a view from the third direction.

FIG. 5 is a plan view of the radio frequency module 1A according to the present modification in a view from the first direction D1, and FIG. 6 is a cross-sectional view of the radio frequency module 1A according to the present modification.

As illustrated in FIG. 5 and FIG. 6, the radio frequency module 1A according to the present modification includes a mounting substrate 2A. The radio frequency module 1A according to the present modification includes the antenna switch 10, the first matching circuit unit 20, the filter group 30, the switch unit 40, the second matching circuit unit 50, the third matching circuit unit 60, the first amplification unit 70, and the second amplification unit 80, as in the case of the radio frequency module 1 according to Embodiment 1.

The mounting substrate 2A according to the present modification has a plate shape or a layered shape, and has the first main surface 2a and the second main surface 2b that are opposed to each other in the first direction D1, as in the case of the mounting substrate 2 according to Embodiment 1.

In the mounting substrate 2A, recesses 201 and 202 are provided with respect to the second main surface 2b at both ends in the second direction D2 that is a direction orthogonal to the first direction D1. For example, the recess 201 is provided at one end (first end) of the both ends of the mounting substrate 2 in the second direction D2, and the recess 202 is provided at the other end (second end) of the both ends of the mounting substrate 2 in the second direction D2.

The components constituting the radio frequency module 1 are provided on the first main surface 2a, the second main surface 2b, a surface 2d of the recess 201, and a surface 2e of the recess 202. For example, the first matching circuit unit 20, the filters 31 to 33 included in the filter group 30, and the first amplification unit 70 are provided on the first main surface 2a. The antenna switch 10, the switch unit 40, and the low noise amplifier IC serving as the second amplification unit 80 are provided on the second main surface 2b.

One chip inductor among the second chip inductor 52, the third chip inductors 61 and 62, and the first chip inductors 21 to 23 is disposed in the recess 201. At least one chip inductor different from the one chip inductor among the second chip inductor 52, the third chip inductors 61 and 62, and the first chip inductors 21 to 23 is disposed in the recess 202 at the other end of the both ends.

In the present modification, the third chip inductors 61 and 62 are disposed in the recess 201, and the second chip inductor 52 is disposed in the recess 202. To be specific, the third chip inductors 61 and 62 are provided on the surface 2*d* of the recess 201. The second chip inductor 52 is provided on the surface 2*e* of the recess 202.

As in the case of Embodiment 1, in a thickness direction (the first direction D1) of the mounting substrate 2A according to the present modification, a solder bump is disposed between the disposed component and the mounting substrate 2A according to the present modification. Note that in FIG. 6, the solder bumps are omitted.

Next, the arrangement of the first chip inductors 21 to 23, the second chip inductor 52, the third chip inductors 61 and 62, and the other constituent elements in the radio frequency module 1A according to the present modification will be described.

The radio frequency module 1A according to the present modification includes a plurality of conductor pillars 90*a* to 90*d* as a plurality of external connection electrodes (see FIG. 6). The plurality of conductor pillars 90*a* to 90*d* is, for example, a copper pillar. The plurality of conductor pillars 90*a* to 90*d* connects the radio frequency module 1 to a motherboard on which the signal processing circuit 3 and the like are mounted. The plurality of conductor pillars 90*a* to 90*d* is a columnar (for example, cylindrical) electrode provided on the second main surface 2*b* of the mounting substrate 2A. The plurality of conductor pillars 90*a* to 90*d* includes the antenna terminal T1 and a ground terminal that is used for grounding and that is used as a ground potential.

The radio frequency module 1A according to the present modification receives a signal received by the antenna 4 through the antenna terminal T1 that is a conductor pillar among the plurality of conductor pillars 90*a* to 90*d*, and outputs the signal to the RF signal processing circuit 5 in the signal processing circuit 3 through another conductor pillar.

The radio frequency module 1A according to the present modification further includes the first resin layer 7 on the first main surface 2*a* of the mounting substrate 2A. The radio frequency module 1A further includes the second resin layer 8 on the second main surface 2*b* of the mounting substrate 2A. A material of the second resin layer 8 may be the same as or different from the material of the first resin layer 7. Note that in FIG. 5, the first resin layer 7 is omitted.

The antenna switch 10, the switch unit 40, and the second amplification unit 80 are disposed on the second main surface 2*b* of the mounting substrate 2A (see FIG. 5 and FIG. 6)

The first chip inductors 21 to 23 are disposed on the first main surface 2*a* of the mounting substrate 2A along the third direction D3 (see FIG. 5). The first chip inductors 21 to 23 are connected to the antenna switch 10.

The filters 31 to 33 are disposed on the first main surface 2*a* of the mounting substrate 2A along the third direction D3 (see FIG. 5). The filters 31 to 33 are connected one-to-one to the first chip inductors 21 to 23.

The third chip inductors 61 and 62 are disposed on the surface 2*d* of the recess 201 (see FIG. 5 and FIG. 6). Further, in the present embodiment, the third chip inductors 61 and 62 are disposed on the surface 2*d* along the third direction D3. Note that the third chip inductors 61 and 62 may be disposed on the surface 2*d* along the second direction D2.

The second chip inductor 52 is disposed on the surface 2*e* of the recess 202 (see FIG. 5 and FIG. 6).

In the mounting substrate 2A according to the present modification, a plurality of via conductors 91*a* to 91*d* is formed along the first direction D1 at both ends of the second main surface 2*b* in the second direction D2 (see FIG. 6).

The via conductors 91*a* to 91*d* are disposed between the recess 200 and the second amplification unit 80 including a low noise amplifier in plan view in the first direction D1 (see FIG. 6). Further, the plurality of conductor pillars 90*a* to 90*d* is disposed either of between the recess 201 and the second amplification unit 80 including the low noise amplifier 81 or between the recess 202 and the second amplification unit 80 including the low noise amplifier 81 in plan view in the first direction D1 (see FIG. 6).

A manufacturing process of the mounting substrate 2A according to the present modification includes cutting with a dicing machine.

In the present modification, as in the case of Embodiment 1, for example, cutting with a dicing machine is performed on a mother substrate 1100 (see FIG. 7A) in which seven mounting substrates 2A are arranged in the second direction D2 and seven mounting substrates 2A are arranged in the third direction D3 regarding a plurality of mounting substrates 2A. Here, in the cutting with the dicing machine of the present modification, there is a process of forming the recesses 201 and 202 in addition to the conventional process. The recesses 201 and 202 are formed in each mounting substrate 2A along the third direction D3. In the mother substrate 1100, cutting positions 1110 to 1115 for cutting the mother substrate 1100 into each mounting substrate 2A in the third direction D3 are present along the second direction D2. In the mother substrate 1100, cutting positions 1120 to 1125 for cutting the mother substrate 1100 into each mounting substrate 2A in the second direction D2 are present along the third direction D3.

In the mother substrate 1100, recesses are formed at both ends (an end portion 1131 and an end portion 1132) of the mother substrate 1100 in the second direction D2. To be specific, the recesses 201 are formed at the end portion 1131, and the recesses 202 are formed at the end portion 1132 (see FIG. 7A). In addition, with respect to the cutting positions 1110 to 1115, for the two adjacent mounting substrates 2A according to the present modification, each recess is formed in a state in which the recess 202 and the recess 201 are connected in order from the left. For example, each recess is formed in a state in which the recess 202 and the recess 201 are connected in respective adjacent mounting substrates 1101 and 1102 (see FIG. 7A).

In addition, a wiring pattern, the electronic components, and the like that are provided on each of the mounting substrates 2A are arranged so as to be symmetrical with respect to the two mounting substrates 2A adjacent to each other with the two connected recesses 200 interposed therebetween, with the cutting position serving as a reference.

A plurality of (49 in the illustrated example) mounting substrates 2A is formed by cutting the mother substrate 1100 at the cutting positions 1110, 1111, 1112, 1113, 1114, and 1115 and further cutting the mother substrate 1100 at the cutting positions 1120, 1121, 1122, 1123, 1124, and 1125. That is, the mounting substrate 2A in which the recesses 201 and 202 are provided with respect to the second main surface 2*b* at the both ends in the second direction D2 is formed by cutting the mother substrate 1100 at the cutting positions 1110 to 1115 and 1120 to 1125 (see FIG. 7B and FIG. 7C). Note that in FIG. 7B and FIG. 7C, components such as the antenna switch 10 that are disposed on the mounting substrate 2A are omitted.

As described above, in the present modification, the mounting substrate 2A has the first main surface 2*a* and the second main surface 2b that are opposed to each other. External connection electrodes (the conductor pillars 90a to 90d) are provided on the second main surface 2b. The recesses 201 and 202 are provided with respect to the second main surface 2b. The second amplification unit 80 including a low noise amplifier is disposed on the second main surface 2b.

In addition, in the present modification, the third chip inductors 61 and 62 are disposed in the recess 201. The first amplification unit 70 including a power amplifier is disposed in a region different from the recess 201. For example, the first amplification unit 70 is disposed on the first main surface 2a.

In addition, in the present modification, the third chip inductors 61 and 62 are disposed in the recess 201. At least either of the second chip inductor 52 or the first chip inductors 21 to 23 is disposed in a region different from the recess 201. For example, the second chip inductor 52 is disposed in the recess 202, and the first chip inductors 21 to 23 are disposed on the first main surface 2a.

Further, in the present modification, the second chip inductor 52 is disposed in the recess 202, the third chip inductors 61 and 62 are disposed in the recess 201, and the first chip inductors 21 to 23 are disposed in a region (for example, on the first main surface 2a) other than the recesses 201 and 202. That is, the height of one chip inductor (the second chip inductor 52 and the third chip inductors 61 and 62) disposed in the recesses 201 and 202 is higher than the heights of the first chip inductors 21 to 23 disposed in the region different from the recesses 201 and 202.

Note that the recesses 201 and 202 may be provided with respect to the first main surface 2a instead of the second main surface 2b in the mounting substrate 2A according to the present modification.

(4-2) Modification 2

In a case where the recesses 201 and 202 are provided with respect to the second main surface 2b at both ends of the mounting substrate 2A in the second direction D2, the component arrangement is not limited to that of Modification 1.

In addition to the third chip inductors 61 and 62, another chip inductor may be provided in the recess 201. Alternatively, another chip inductor may be provided in the recess 202, in addition to the second chip inductor 52.

Figure 8:
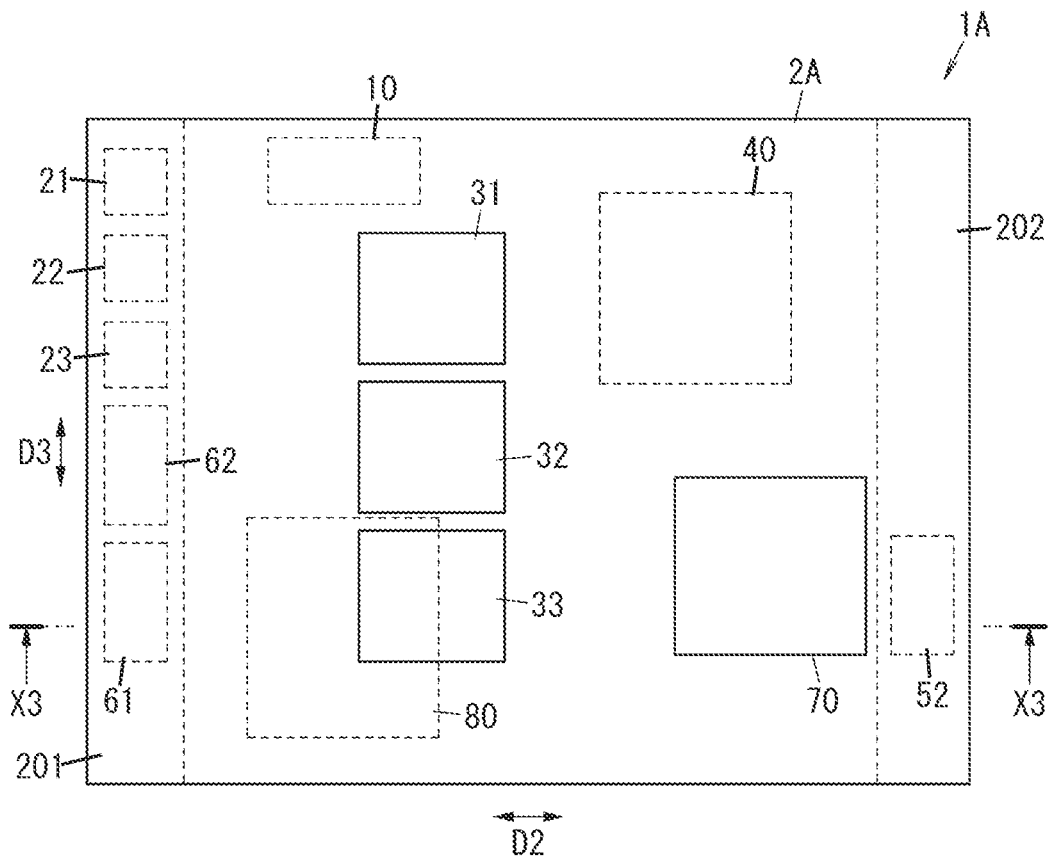
FIG. 8 is a schematic plan view for explaining a configuration of a radio frequency module according to Modification 2 of Embodiment 1.
Figure 9:
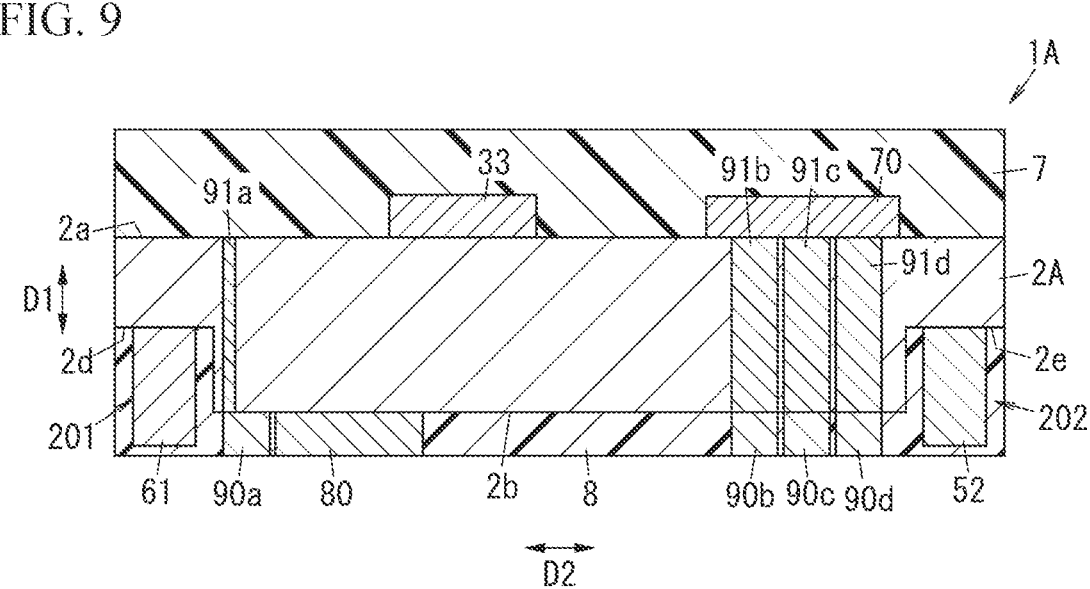
FIG. 9 is an X3-X3 cross-sectional view of FIG. 8.

For example, the first chip inductors 21 to 23 and the third chip inductors 61 and 62 may be provided in the recess 201 (see FIG. 8 and FIG. 9). Note that in FIG. 9, solder bumps are omitted as in FIG. 3 and FIG. 5.

In the present modification, the first chip inductors 21 to 23 are disposed on the surface 2d of the recess 201 along the third direction D3 (see FIG. 8). That is, the third chip inductors 61 and 62 and the first chip inductors 21 to 23 are disposed on the surface 2d of the recess 201 along the third direction D3.

(4-3) Modification 3

In the radio frequency module 1 according to Embodiment 1 and the radio frequency module 1A according to Modification 1, the second resin layer 8 is provided. Further, the radio frequency module 1 according to Embodiment 1 includes the plurality of external connection electrodes 90, and is connected to the motherboard by the plurality of external connection electrodes 90. The radio frequency module 1A according to Modification 1 includes the plurality of conductor pillars 90a to 90d, and is connected to the motherboard by the plurality of conductor pillars 90a to 90d.

Figure 10:
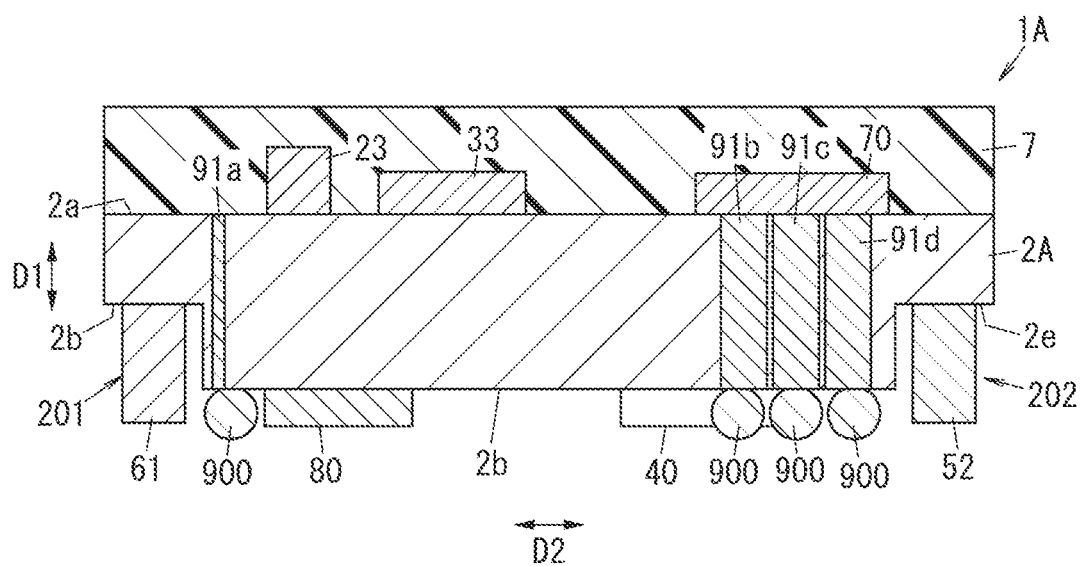
FIG. 10 is a schematic cross-sectional view for explaining a configuration of a radio frequency module according to Modification 3 of Embodiment 1.

On the other hand, for example, as illustrated in FIG. 10, the second resin layer may be omitted on the second main surface 2b side of the mounting substrate 2A according to Modification 1, and the radio frequency module 1A may be connected to the motherboard by a plurality of external connection electrodes 900 formed in a spherical shape.

Each of the plurality of external connection electrodes 900 is, for example, a ball bump formed in a spherical shape. A material of the ball bump is, for example, gold, copper, solder, or the like.

Similarly, also in the radio frequency module 1 according to Embodiment 1, the plurality of external connection electrodes 900 described above may be used instead of the plurality of external connection electrodes 90.

(4-4) Modification 4

The above-described embodiment has the configuration in which the antenna switch 10 and the switch unit 40 are separately disposed, but the present disclosure is not limited to the configuration.

The antenna switch 10 and the switch unit 40 may be integrated into one chip.

(4-5) Modification 5

The above-described embodiment has the configuration in which the first amplification unit 70 including the power amplifier 71 is disposed in the recess 200, but the present disclosure is not limited to the configuration.

The first amplification unit 70 may be disposed on the first main surface 2a. In this case, the first amplification unit 70 is disposed at a position that does not overlap with the second amplification unit 80 including the low noise amplifier 81 disposed on the second main surface 2b in plan view in the first direction D1 of the mounting substrate 2.

(4-6) Modification 6

The above-described embodiment has the configuration in which the second chip inductor 52 is disposed in the recess 200, and the first chip inductors 21 to 23 and the third chip inductors 61 and 62 are disposed in a region (for example, the first main surface 2a) other than the recess 200, but the present disclosure is not limited to the configuration.

Either of the first chip inductors 21 to 23 or the third chip inductors 61 and 62, and the second chip inductor 52 may be disposed in the recess 200. In other words, the second chip inductor 52 may be disposed in the recess 200, and at least either of the first chip inductors 21 to 23 or the third chip inductors 61 and 62 may be disposed in a region other than the recess 200.

(4-7) Modification 7

The above-described embodiment has the configuration in which the second amplification unit 80, that is, the low noise amplifier 81 is provided on the second main surface 2b, but the present disclosure is not limited to the configuration.

Instead of providing the second amplification unit 80, that is, the low noise amplifier 81, the first amplification unit 70, that is, the power amplifier 71 may be provided on the second main surface 2b.

Similarly, in the other modifications, instead of providing the second amplification unit 80, that is, the low noise amplifier 81, the first amplification unit 70, that is, the power amplifier 71 may be provided on the second main surface 2b.

Embodiment 2

This embodiment is different from Embodiment 1 in that transmission and reception are performed in different communication bands.

Differences from Embodiment 1 will be mainly described below. Note that constituent elements similar to those in Embodiment 1 are denoted by the same reference signs, and description thereof is appropriately omitted.

Figure 11:
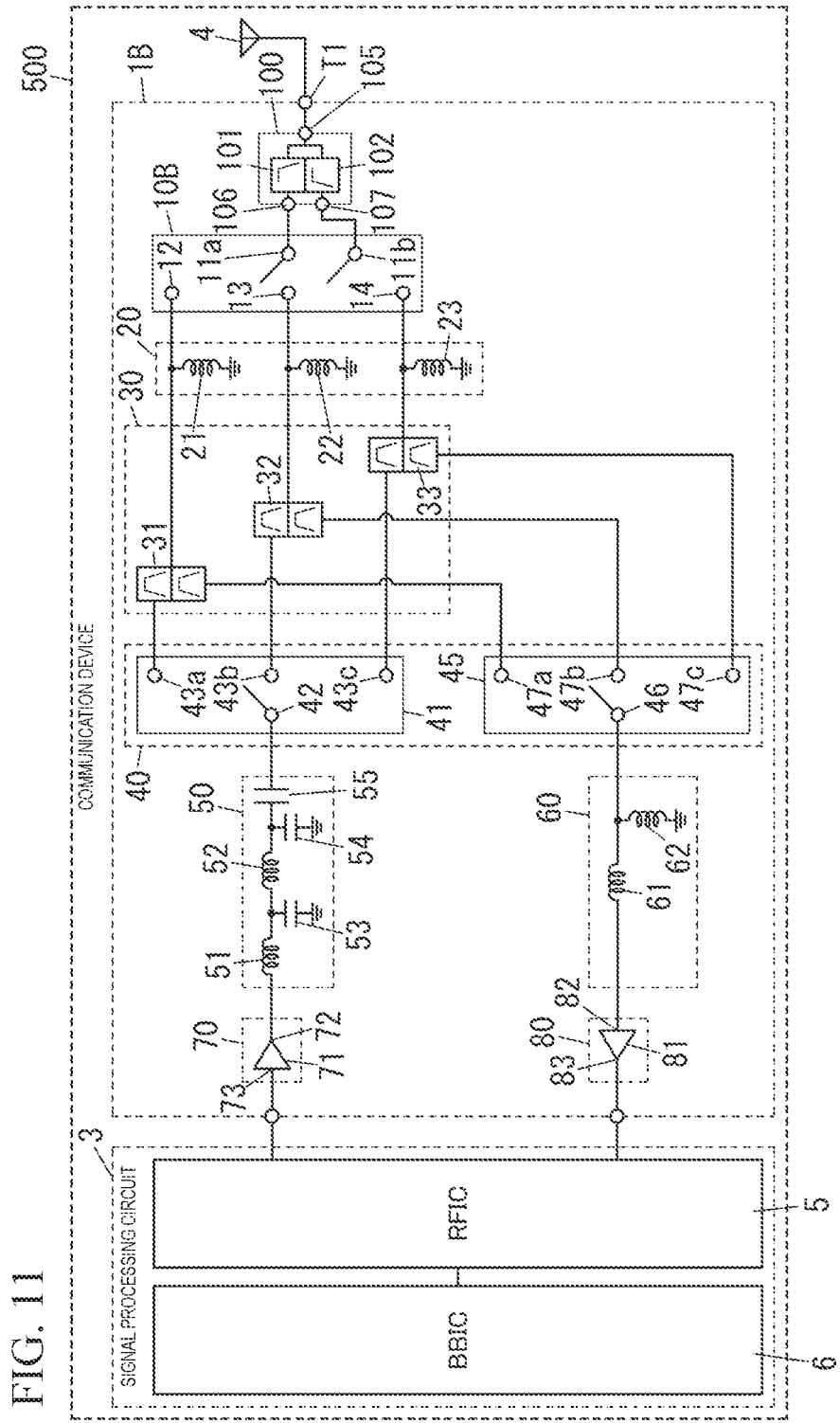
FIG. 11 is a schematic circuit diagram for explaining a communication device including a radio frequency module according to Embodiment 2.

As illustrated in FIG. 11, the communication device 500 according to the present embodiment includes a radio frequency module 1B, the antenna 4, and the signal processing circuit 3. The communication device 500 transmits and receives signals through the antenna 4. In the present embodiment, a frequency band of reception signals is higher than a frequency band of transmission signals.

Figure 12:
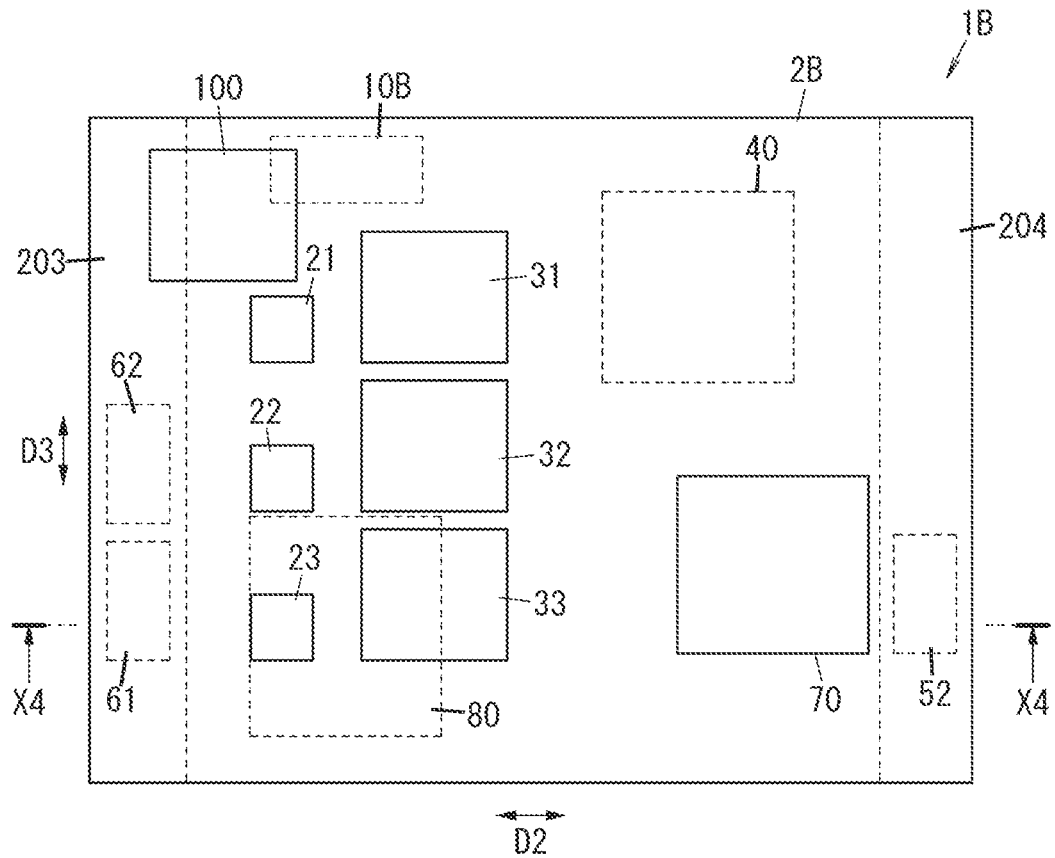
FIG. 12 is a schematic plan view for explaining a configuration of the above-described radio frequency module.
Figure 13:
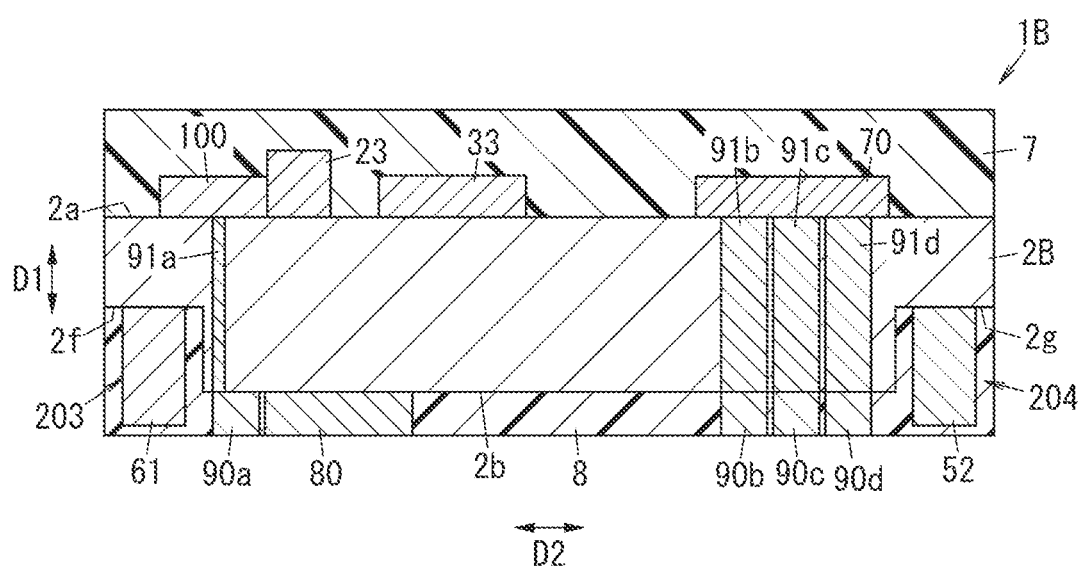
FIG. 13 is an X4-X4 cross-sectional view of FIG. 12.

As illustrated in FIG. 11 to FIG. 13, the radio frequency module 1B according to the present embodiment includes a mounting substrate 2B, a diplexer 100, an antenna switch 10B, the first matching circuit unit 20, the filter group 30, the switch unit 40, the second matching circuit unit 50, the third matching circuit unit 60, the first amplification unit 70, and the second amplification unit 80.

The diplexer 100 includes a low pass filter 101 and a high pass filter 102 (see FIG. 11). The diplexer 100 is connected to the antenna terminal T1 and the filters 31 to 33. To be more specific, a first terminal 105 of the diplexer 100 is connected to the low pass filter 101, the high pass filter 102, and the antenna terminal T1. A second terminal 106 of the diplexer 100 is connected to the low pass filter 101. A third terminal 107 of the diplexer 100 is connected to the high pass filter 102. Further, the second terminal 106 and the third terminal 107 are connected to the filters 31 to 33 with the antenna switch 10B interposed therebetween. The diplexer 100 performs mixing and isolation of signals in different communication bands.

The antenna switch 10B is connected to the antenna 4 with the diplexer 100 interposed therebetween. The antenna switch 10B is, for example, a switch IC. To be specific, the antenna switch 10B includes a first common terminal 11a, a second common terminal 11b, and a plurality of (three in the illustrated example) selection terminals (the first selection terminal 12, the second selection terminal 13, and the third selection terminal 14) (see FIG. 11). The first common terminal 11a is connected to the second terminal 106 of the diplexer 100. The second common terminal 11b is connected to the third terminal 107 of the diplexer 100.

The antenna switch 10B switches a connection state between the first common terminal 11a and the first selection terminal 12, the second selection terminal 13, and the third selection terminal 14. Further, the antenna switch 10B switches a connection state between the second common terminal 11b and the first selection terminal 12, the second selection terminal 13, and the third selection terminal 14.

The antenna switch 10B is controlled by, for example, the signal processing circuit 3. The antenna switch 10B switches connection destinations of the first common terminal 11a and the second common terminal 11b in accordance with a control signal from the RF signal processing circuit 5 in the signal processing circuit 3.

Next, the arrangement of the first chip inductors 21 to 23, the second chip inductor 52, the third chip inductors 61 and 62, and the other constituent elements in the radio frequency module 1B will be described.

FIG. 12 is a plan view of the radio frequency module 1B in a view from the first direction D1, and FIG. 13 is a cross-sectional view of the radio frequency module 1B.

As illustrated in FIG. 12 and FIG. 13, the radio frequency module 1B includes the mounting substrate 2B. The radio frequency module 1B includes the diplexer 100, the antenna switch 10B, the first matching circuit unit 20, the filter group 30, the switch unit 40, the second matching circuit unit 50, the third matching circuit unit 60, the first amplification unit 70, and the second amplification unit 80.

As in the cases of the mounting substrates 2 and 2A described above, the mounting substrate 2B has a plate shape or a layered shape, and has the first main surface 2a and the second main surface 2b that are opposed to each other in the first direction D1.

The mounting substrate 2B is provided with recesses 203 and 204 with respect to the second main surface 2b at both ends in the second direction D2. For example, the recess 203 is provided at one end (first end) of the both ends of the mounting substrate 2B in the second direction D2, and the recess 204 is provided at the other end (second end) of the both ends of the mounting substrate 2B in the second direction D2. The components constituting the radio frequency module 1B are provided on the first main surface 2a, the second main surface 2b, a surface 2f of the recess 203, and a surface 2g of the recess 204.

The first matching circuit unit 20, the filters 31 to 33 included in the filter group 30, the first amplification unit 70, and the diplexer 100 are provided on the first main surface 2a. The antenna switch 10B, the switch unit 40, and a low noise amplifier IC serving as the second amplification unit 80 are provided on the second main surface 2b.

One chip inductor among the second chip inductor 52, the third chip inductors 61 and 62, and the first chip inductors 21 to 23 is disposed in the recess 203. At least one chip inductor different from the one chip inductor of the second chip inductor 52, the third chip inductors 61 and 62, and the first chip inductors 21 to 23 is disposed in the recess 204. In the present embodiment, the third chip inductors 61 and 62 are disposed in the recess 203, and the second chip inductor 52 is disposed in the recess 204. To be specific, the third chip inductors 61 and 62 are provided on the surface 2f of the recess 203. The second chip inductor 52 is provided on the surface 2g of the recess 204.

As in Embodiment 1, in the thickness direction of the mounting substrate 2B (the first direction D1), a solder bump is disposed between the mounted component and the mounting substrate 2B. Note that in FIG. 13, the solder bumps are omitted.

The radio frequency module 1B includes a plurality of conductor pillars 90a to 90d as a plurality of external connection electrodes (see FIG. 13). Since the plurality of conductor pillars 90a to 90d has been described in Modification 1 of Embodiment 1, description thereof is omitted here.

The radio frequency module 1B receives a signal received by the antenna 4 through the antenna terminal T1 that is a conductor pillar among the plurality of conductor pillars 90a to 90d, and outputs the signal to the RF signal processing circuit 5 in the signal processing circuit 3 through another conductor pillar.

The radio frequency module 1B further includes the first resin layer 7 on the first main surface 2a of the mounting substrate 2B. The radio frequency module 1B further includes the second resin layer 8 on the second main surface 2b of the mounting substrate 2B. A material of the second resin layer 8 may be the same as or different from the material of the first resin layer 7. Note that in FIG. 12, the first resin layer 7 is omitted.

The antenna switch 10B, the switch unit 40, and the second amplification unit 80 are disposed on the second main surface 2b of the mounting substrate 2B (see FIG. 12 and FIG. 13).

Here, the antenna switch 10B can be disposed such that the diplexer 100 and at least a part of the antenna switch 10B overlap each other in a view from the third direction D3. This makes it possible to shorten a wiring distance between the antenna switch 10B and the diplexer 100.

The first chip inductors 21 to 23 are disposed on the first main surface 2a of the mounting substrate 2B along the third direction D3 (see FIG. 12). The first chip inductors 21 to 23 are connected to the antenna switch 10B.

The filters 31 to 33 are disposed on the first main surface 2a of the mounting substrate 2B along the third direction D3 (see FIG. 12). The filters 31 to 33 are connected one-to-one to the first chip inductors 21 to 23.

The third chip inductors 61 and 62 are disposed on the surface 2f of the recess 203 (see FIG. 12 and FIG. 13). Further, in the present embodiment, the third chip inductors 61 and 62 are disposed on the surface 2f along the third direction D3. Note that the third chip inductors 61 and 62 may be disposed on the surface 2f along the second direction D2.

The second chip inductor 52 is disposed on the surface 2g of the recess 204 (see FIG. 12 and FIG. 13).

In the mounting substrate 2B, a plurality of via conductors 91a to 91d is formed along the first direction D1 at both ends of the second main surface 2b in the second direction D2 (see FIG. 13).

The via conductors 91a to 91d are disposed between the recess 200 and the second amplification unit 80 including a low noise amplifier in plan view in the first direction D1 (see FIG. 13). Further, the plurality of conductor pillars 90a to 90d is disposed either of between the recess 201 and the low noise amplifier or between the recess 202 and the low noise amplifier in plan view in the first direction D1 (see FIG. 13).

A manufacturing process of the mounting substrate 2B includes cutting with a dicing machine. Note that the cutting with the dicing machine is similar to those in modifications of Embodiment 1, and description thereof is omitted here.

As described above, the mounting substrate 2B has the first main surface 2a and the second main surface 2b that are opposed to each other. External connection electrodes (the conductor pillars 90a to 90d) are provided on the second main surface 2b. The recesses 203 and 204 are provided with respect to the second main surface 2b. The second amplification unit 80 including a low noise amplifier is disposed on the second main surface 2b.

Further, the third chip inductors 61 and 62 are disposed in the recess 203. The first amplification unit 70 including a power amplifier is disposed in a region different from the recess 203. For example, the first amplification unit 70 is disposed on the first main surface 2a.

Further, the third chip inductors 61 and 62 are disposed in the recess 203. At least either of the second chip inductor 52 or the first chip inductors is disposed in a region different from the recess 203. For example, the second chip inductor 52 is disposed in the recess 204, and the first chip inductors 21 to 23 are disposed on the first main surface 2a.

Note that the recesses 203 and 204 may be provided with respect to the first main surface 2a of the mounting substrate 2B.

Further, in the present embodiment, the second chip inductor 52 is disposed in the recess 204, the third chip inductors 61 and 62 are disposed in the recess 203, and the first chip inductors 21 to 23 are disposed in a region (for example, on the first main surface 2a) other than the recesses 203 and 204. That is, the height of one chip inductor (the second chip inductor 52 and the third chip inductors 61 and 62) disposed in each of the recesses 203 and 204 is higher than the heights of the first chip inductors 21 to 23 disposed in the region different from the recesses 203 and 204.

In the present embodiment, the radio frequency module 1 includes, as chip inductors, a chip inductor for choke included in the power amplifier 71, a chip inductor included in the low noise amplifier 81, and a chip inductor included in each of the filters 31 to 33, in addition to the third chip inductors 61 and 62, the first chip inductors 21 to 23, and the second chip inductor 52. When the chip inductors included in the radio frequency module 1 are arranged, the third chip inductors 61 and 62 and the second chip inductor 52 have the highest height in the first direction D1 among the chip inductors. Additionally, among these chip inductors, the first chip inductors 21 to 23 have the lowest height.

Additionally, as in Modification 2 of Embodiment 1, another chip inductor may be provided in the recess 203 in addition to the third chip inductors 61 and 62, or another chip inductor may be provided in the recess 202 in addition to the second chip inductor 52.

In addition, as in Modification 3 of Embodiment 1, the plurality of conductor pillars 90a to 90d (external connection electrodes) may be ball bumps.

Further, as in Modification 4 of Embodiment 1, the antenna switch 10B and the switch unit 40 may be integrated into one chip.

In addition, the mounting substrate 2B may have only one recess as in the mounting substrate 2 of Embodiment 1.

Also in the present embodiment, instead of providing the second amplification unit 80, that is, the low noise amplifier 81, the first amplification unit 70, that is, the power amplifier 71 may be provided on the second main surface 2b.

Further, the radio frequency module 1B may be configured to be adaptive to carrier aggregation and dual connectivity. In a case of being adaptive to the carrier aggregation, for example, carrier aggregation of a combination of Band40 that is in a high band or Band41 that is in the high band and one or two of Band1, Band3, Band2, Band25, Band4, Band66, Band39, and Band34 that are in a mid band can be supported.

Embodiment 3

The present embodiment is different from Embodiment 1 in that a recess is provided with respect to an outer periphery of a mounting substrate.

Differences from Embodiment 1 will be mainly described below. Note that constituent elements similar to those in Embodiment 1 are denoted by the same reference signs, and description thereof is appropriately omitted.

As illustrated in FIG. 14 to FIG. 16B, a radio frequency module 1C included in the communication device 500 according to the present embodiment includes a mounting substrate 2C, the first matching circuit unit 20 including a plurality of (three in the illustrated example) first chip inductors 21 to 23, the filter group 30 including a plurality of filters 31 to 33, the second matching circuit unit 50 including the second chip inductor 52, the third matching circuit unit 60 including the third chip inductors 61 and 62, the first amplification unit 70, and a switch IC 800.

The switch IC 800 includes the antenna switch 10, the switch unit 40, and the second amplification unit 80 that have been described in Embodiment 1. That is, the switch IC 800 is a semiconductor element in which the antenna switch 10, the switch unit 40, and the second amplification unit 80 are formed as one chip.

Next, the arrangement of the first chip inductors 21 to 23, the second chip inductor 52, the third chip inductors 61 and 62, and the other constituent elements in the radio frequency module 1C will be described.

Figure 14:
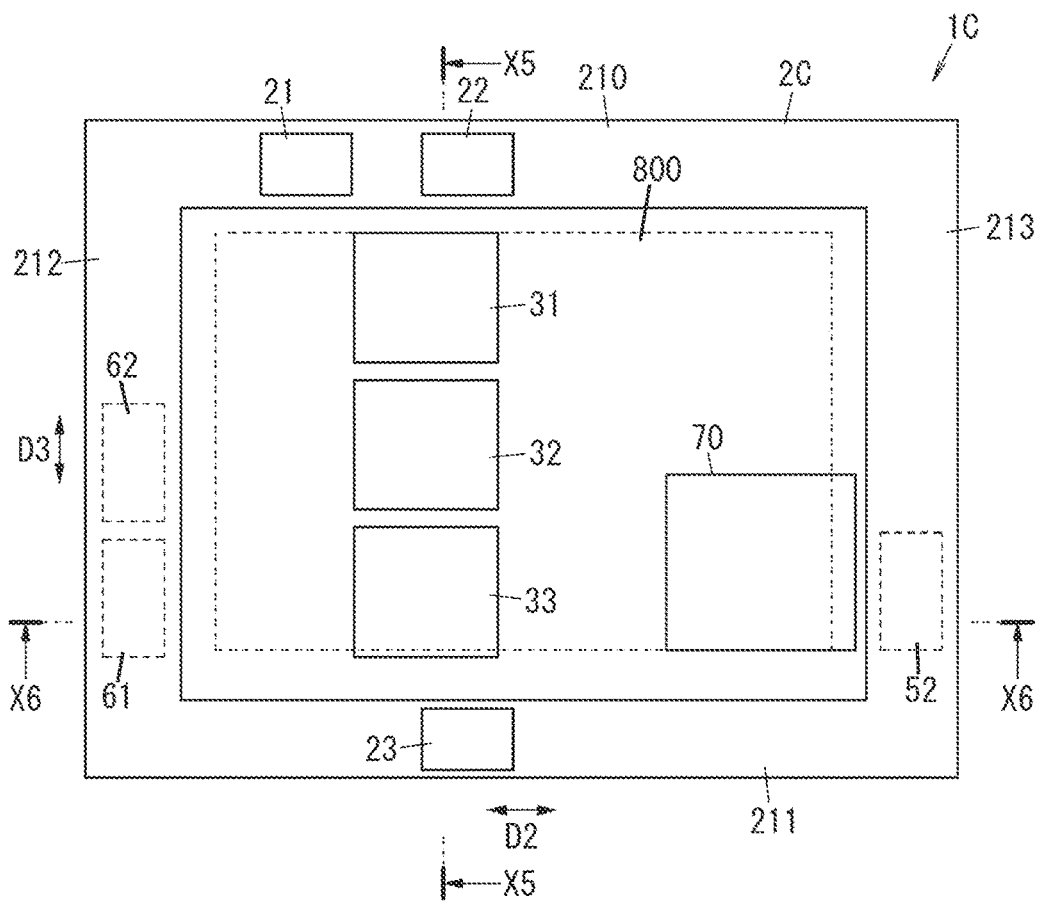
FIG. 14 is a schematic plan view for explaining a configuration of a radio frequency module according to Embodiment 3.
Figure 15:
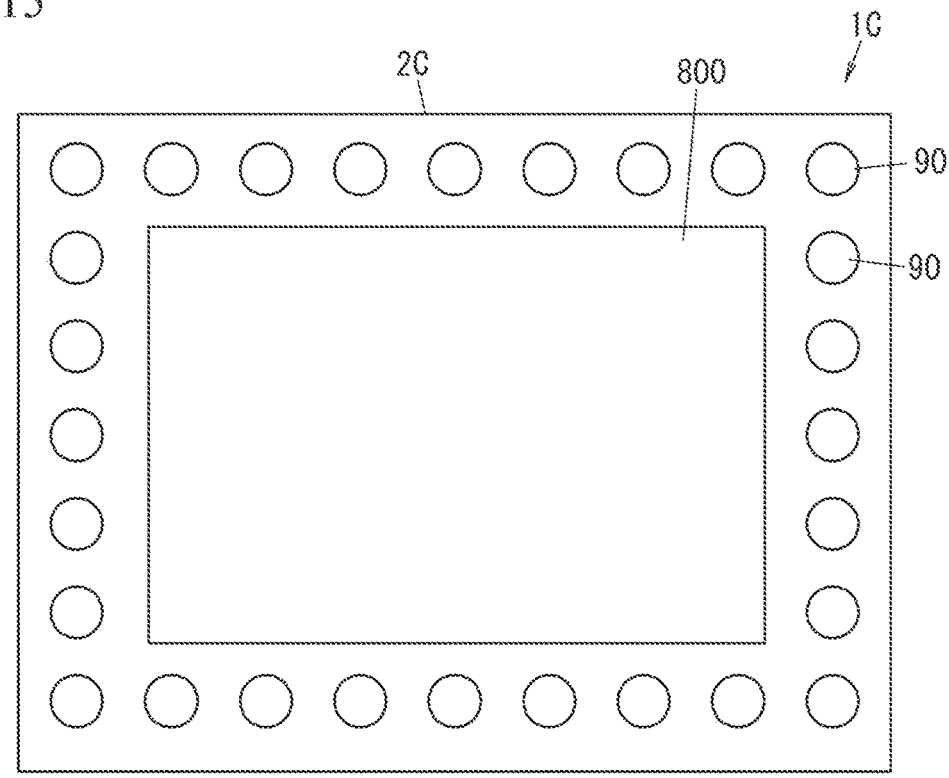
FIG. 15 is a schematic bottom view of the above-described radio frequency module.
Figure 16A:
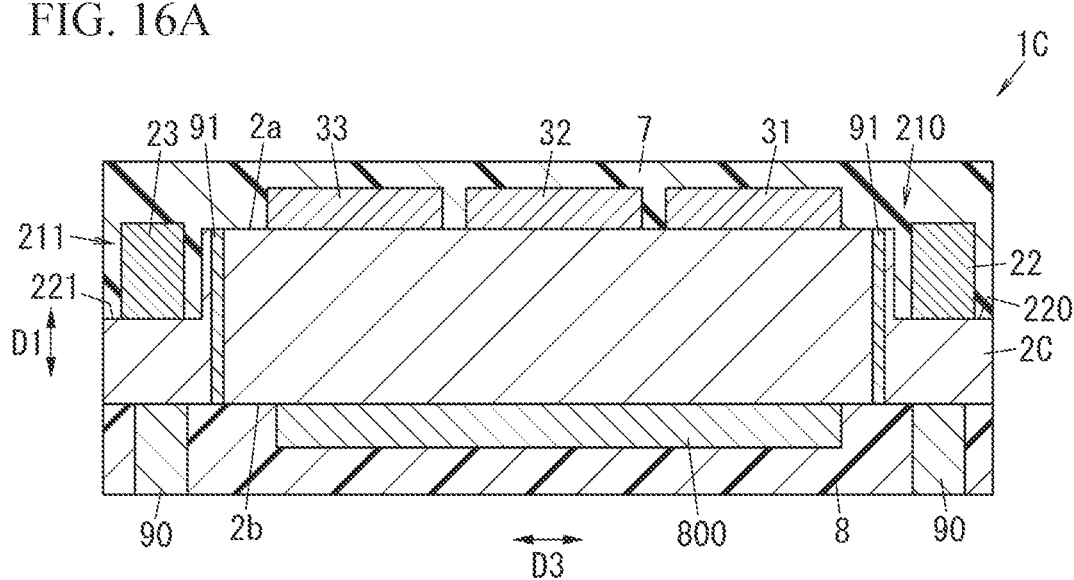
FIG. 16A is an X5-X5 cross-sectional view of FIG. 14.
Figure 16B:
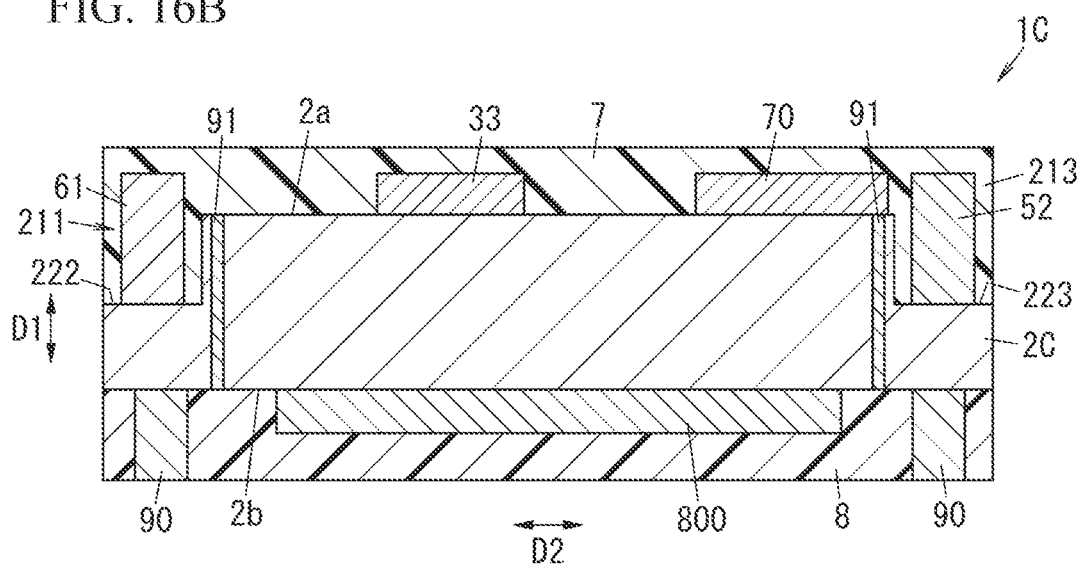
FIG. 16B is an X6-X6 cross-sectional view of FIG. 14.

FIG. 14 is a plan view of the radio frequency module 1C when the first main surface 2a is seen from the first direction D1, FIG. 15 is a bottom view of the radio frequency module 1C when the second main surface 2b is seen from the first direction D1, and FIG. 16A and FIG. 16B are cross-sectional views of the radio frequency module 1C.

The radio frequency module 1C includes a plurality of external connection electrodes 90 (see FIG. 15, FIG. 16A and FIG. 16B). The plurality of external connection electrodes 90 connects the radio frequency module 1C to a motherboard on which the signal processing circuit 3 and the like are mounted. The plurality of external connection electrodes 90 is a columnar (for example, cylindrical) electrode provided on the second main surface 2b of the mounting substrate 2C. A material of the plurality of external connection electrodes 90 is, for example, metal (for example, copper, a copper alloy, or the like). The plurality of external connection electrodes 90 includes the antenna terminal T1 and a ground terminal to be used for grounding.

The radio frequency module 1C receives a signal received by the antenna 4 through the antenna terminal T1 that is one external connection electrode 90 of the plurality of external connection electrodes 90, and outputs the signal to the RF signal processing circuit 5 in the signal processing circuit 3 through another external connection electrode 90.

The radio frequency module 1C further includes, on the first main surface 2a of the mounting substrate 2C, the first resin layer 7 covering electronic components, such as the filters 31 to 33 mounted on the first main surface 2a. The radio frequency module 1C further includes the second resin layer 8 covering electronic components such as the switch IC 800 on the second main surface 2b of the mounting substrate 2C. A material of the second resin layer 8 may be the same as or different from the material of the first resin layer 7. Note that in FIG. 14, the first resin layer 7 is omitted.

Recesses 210 to 213 are provided with respect to the outer periphery of the mounting substrate 2C (see FIG. 14, FIG. 16A, and FIG. 16B). To be specific, the recesses 210 and 211 are provided at both ends of the mounting substrate 2C in the third direction D3, and the recesses 212 and 213 are provided at both ends of the mounting substrate 2C in the second direction D2.

The first chip inductors 21 and 22 are disposed in the recess 210 of the mounting substrate 2C along the second direction D2, and the first chip inductor 23 is disposed in the recess 211 of the mounting substrate 2C. That is, the first chip inductors 21 and 22 are disposed on a surface 220 of the recess 210 (see FIG. 16A), and the first chip inductor 23 is disposed on a surface 221 of the recess 211 (see FIG. 16A). The first chip inductors 21 to 23 are connected to the antenna switch 10 included in the switch IC 800.

The filters 31 to 33 are disposed on the first main surface 2a of the mounting substrate 2C along the third direction D3 (see FIG. 16A). The filters 31 to 33 are connected one-to-one to the first chip inductors 21 to 23. The filters 31 to 33 are connected to both the first switch 41 and the second switch 45 of the switch unit 40 included in the switch IC 800.

The third chip inductors 61 and 62 are disposed in the recess 212. That is, the third chip inductors 61 and 62 are disposed on a surface 222 of the recess 212 (see FIG. 16B). Further, in present embodiment, the third chip inductors 61 and 62 are disposed in the recess 212 along the third direction D3. The third chip inductors 61 and 62 are connected to the second switch 45 included in the switch IC 800. The third chip inductor 61 is connected to the low noise amplifier 81 of the second amplification unit 80 included in the switch IC 800.

The third chip inductors 61 and 62 may be disposed in the recess 212 along the second direction D2.

The second chip inductor 52 is disposed in the recess 213. That is, the second chip inductor 52 is disposed on a surface 223 of the recess 213 (see FIG. 16B). The second chip inductor 52 is connected to the first switch 41 included in the switch IC 800.

The first amplification unit 70 is disposed on the first main surface 2a (see FIG. 16B). Note that the first amplification unit 70 may be disposed in the recess 213.

Note that the second amplification unit 80 included in the switch IC 800 disposed on the second main surface 2b can be disposed at a position that does not overlap the first amplification unit 70 in plan view in the first direction D1 of the mounting substrate 2C.

In the mounting substrate 2C, the via conductor 91 (through electrode) that is connected to the ground terminal of the plurality of external connection electrodes 90 to be used as a ground potential is formed along the first direction D1 at an end portion close to a corresponding recess among both ends of the first main surface 2a in each of the second direction D2 and the third direction D3 (see FIG. 16A and FIG. 16B). Note that in FIG. 16A and FIG. 16B, connection destinations of the via conductors 91 are omitted. For example, each via conductor 91 is disposed between the corresponding recess and the switch IC 800 in plan view in the first direction D1 (see FIG. 16A and FIG. 16B).

Note that the recesses 210 to 213 may be applied to (the mounting substrate 2B of) the radio frequency module 1B according to Embodiment 2. That is, the recesses may be provided with respect to the outer periphery of the second main surface 2b of the mounting substrate 2B. That is, with respect to the second main surface 2b of the mounting substrate 2B, the recesses may be provided at the both ends in the second direction D2 and the both ends in the third direction D3.

Further, in the radio frequency module 1C of the present embodiment, the antenna switch 10, the switch unit 40, and the second amplification unit 80 may be individually provided instead of providing the switch IC 800 in which the antenna switch 10, the switch unit 40, and the second amplification unit 80 are configured in one chip.

In addition, by adjusting depths of the recesses 210 to 213, that is, distances from the first main surface 2a to the surfaces of the recesses, tips of the third chip inductors 61 and 62 and the second chip inductor 52 that have the highest height in the first direction D1 can be aligned with tips of the filters 31 to 33 and the first amplification unit 70 that are disposed on the first main surface 2a.

Further, wiring for the filters 31 to 33 and the switch IC 800 may be complicated in some cases. Thus, the filters 31 to 33 are disposed on the first main surface 2a, and the switch IC 800 is disposed on the second main surface 2b. That is, the mounting substrate 2C on which the filters 31 to 33 and the switch IC 800 are disposed is thick. Thus, the wiring related to the filters 31 to 33 and the switch IC 800 can be provided inside the mounting substrate 2C.

SUMMARY

As described above, a radio frequency module (1; 1A; 1B; 1C) according to a first aspect includes a mounting substrate (2; 2A; 2B; 2C) and one or more chip inductors (for example, the third chip inductors 61 and 62, the first chip inductors 21 to 23, the second chip inductor 52, a chip inductor for choke, a chip inductor included in the low noise amplifier 81, and chip inductors included in the respective filters 31 to 33). The mounting substrate (2; 2A; 2B) has a recess (200; 201; 202; 203; 204; 210; 211; 212; 213) at at least one end of both ends in a direction (for example, the second direction D2 and the third direction D3) orthogonal to a thickness direction (the first direction D1). At least one chip inductor of the one or more chip inductors is arranged in the recess (200; 201; 202; 203; 204; 210; 211; 212; 213).

According to this configuration, the mounting substrate (2; 2A; 2B; 2C) has the recess (200; 201; 202; 203; 204; 210; 211; 212; 213) at at least one end of the both ends in the direction orthogonal to the thickness direction. Thus, by disposing an electronic component (for example, a chip inductor) in the recess (200; 201; 202; 203; 204; 210; 211; 212; 213), the height of the radio frequency module (1; 1A; 1B) can be reduced.

The radio frequency module (1; 1A; 1B; 1C) according to a second aspect further includes, in the first aspect, a power amplifier (71) that amplifies a transmission signal to an antenna terminal (T1) and a low noise amplifier (81) that amplifies a reception signal from the antenna terminal (T1). The one or more chip inductors include a plurality of chip inductors. The plurality of chip inductors includes a first chip inductor (21 to 23), a second chip inductor (52), and a third chip inductor (61; 62). The first chip inductor (21 to 23) is connected to the antenna terminal (T1). The second chip inductor (52) is connected to an output side of the power amplifier (71). The third chip inductor (61; 62) is connected to an input side of the low noise amplifier (81). The at least one chip inductor disposed in the recess (200; 201; 202; 203; 204; 210; 211; 212; 213) includes at least one of the second chip inductor (52), the third chip inductor (61; 62), and the first chip inductor (21 to 23).

According to this configuration, any one of the first chip inductor (21 to 23), the second chip inductor (52), and the third chip inductor (61; 62) is disposed in the recess (200; 201; 202; 203; 204). Thus, among the first chip inductor (21 to 23), the second chip inductor (52), and the third chip inductor (61; 62), it is possible to increase an interval between a chip inductor disposed in the recess (200; 201; 202; 203; 204; 210; 211; 212; 213) and a chip inductor not disposed in the recess. Thus, it is possible to improve isolation characteristics between these chip inductors.

In the radio frequency module (1; 1A; 1B; 1C) according to a third aspect, in the second aspect, the second chip inductor (52) is disposed in the recess (200; 202; 204; 213). The low noise amplifier (81) is arranged in a region different from the recess (200; 202; 204; 213).

According to this configuration, the isolation characteristics between the second chip inductor (52) and the low noise amplifier (81) can be improved.

In the radio frequency module (1A; 1B) according to a fourth aspect, in the third aspect, the mounting substrate (2A; 2B) includes a first main surface (2a) and a second main surface (2b) that are opposed to each other. External connection electrodes (the conductor pillars 90a to 90d) are provided on the second main surface (2b). The recess (202; 204) is provided with respect to the second main surface (2b). The low noise amplifier (81) is disposed on the second main surface (2b).

According to this configuration, the isolation characteristics between the second chip inductor (52) and the low noise amplifier (81) can be improved.

In the radio frequency module (1; 1A; 1B; 1C) according to a fifth aspect, in the second aspect, the second chip inductor (52) is disposed in the recess (200; 202; 204; 213). At least one of the first chip inductor (21 to 23) and the third chip inductor (61; 62) is disposed in a region different from the recess (200; 202; 204; 213).

According to this configuration, it is possible to improve the isolation characteristics between the second chip inductor (52) and a chip inductor that is the at least one of the first chip inductor (21 to 23) and the third chip inductor (61; 62) and that is disposed in a region different from the recess (200; 202; 204; 213).

In the radio frequency module (1A; 1B; 1C) according to a sixth aspect, in the second aspect, the third chip inductor (61; 62) is disposed in the recess (201; 203; 212). The power amplifier (71) is arranged in a region different from the recess (201; 203; 212).

According to this configuration, the isolation characteristics between the third chip inductor (61; 62) and the power amplifier (71) can be improved.

In the radio frequency module (1A; 1B; 1C) according to a seventh aspect, in the second aspect, the third chip inductor (61; 62) is disposed in the recess (201; 203; 212). At least one of the first chip inductor (21 to 23) and the second chip inductor (52) is disposed in a region different from the recess (201; 203; 212).

According to this configuration, it is possible to improve the isolation characteristics between the third chip inductor (61; 62) and a chip inductor that is the at least one of the first chip inductor (21 to 23) and the second chip inductor (52) and that is disposed in a region different from the recess (201; 203; 212).

In the radio frequency module (1A; 1B) according to an eighth aspect, in the sixth or seventh aspect, the mounting substrate (2A; 2B) has the first main surface (2a) and the second main surface (2b) that are opposed to each other. External connection electrodes (the conductor pillars 90a to 90d) are provided on the second main surface (2b). The recess (2021; 202; 203; 204) is provided with respect to the second main surface (2b). The power amplifier (71) is disposed on the first main surface (2a).

According to this configuration, it is possible to improve the isolation between the power amplifier (71) and a chip inductor that is disposed in the recess (200; 201; 202; 203; 204) among the second chip inductor (52), the first chip inductor (21 to 23), and the third chip inductor (61; 62).

In the radio frequency module (1A; 1B) according to a ninth aspect, in any one of the second to eighth aspects, the recess (201; 202; 203; 204) is provided at each of both ends in a direction (second direction D2) orthogonal to the thickness direction (first direction D1). One chip inductor among the first chip inductor (21 to 23), the second chip inductor (52), and the third chip inductor (61; 62) is disposed in the recess (202; 204) at the first end of the both ends. At least one chip inductor different from the one chip inductor described above among the first chip inductor (21 to 23), the second chip inductor (52), and the third chip inductor (61; 62) is disposed in the recess (201; 203) at the second end of the both ends.

According to this configuration, it is possible to improve the isolation characteristics between two chip inductors among the first chip inductor (21 to 23), the second chip inductor (52), and the third chip inductor (61; 62).

In the radio frequency module (1A; 1B) according to a tenth aspect, in the ninth aspect, the second chip inductor (52) is disposed in the recess (202; 204) at the first end of the both ends. The first chip inductor (21 to 23) and the third chip inductor (61; 62) are disposed in the recess (201; 203) at the second end of the both ends.

According to this configuration, the isolation between the second chip inductor (52) and the third chip inductor (61; 62) and the isolation between the first chip inductor (21 to 23) and the second chip inductor (52) can be improved.

In the radio frequency module (1; LA; 1B) according to an eleventh aspect, in the second aspect, one chip inductor among the first chip inductor (21 to 23), the second chip inductor (52), and the third chip inductor (61; 62) is disposed in the recess (200; 201; 202; 203; 204). The chip inductors different from the one chip inductor described above among the first chip inductor (21 to 23), the second chip inductor (52), and the third chip inductor (61; 62) are disposed in a region different from the recess (200; 201; 202; 203; 204). The height of the one chip inductor arranged in the recess (200; 201; 202; 203; 204) is higher than the heights of the other chip inductors arranged in the region different from the recess.

According to this configuration, the height of the radio frequency module (1; 1A; 1B) can be reduced.

In the radio frequency module (1) according to a twelfth aspect, in the second aspect, the mounting substrate (2) has the first main surface (2a) and the second main surface (2b) that are opposed to each other. The external connection electrode (90) is provided on the second main surface (2b). The recess (200) is provided with respect to the first main surface (2a). The second chip inductor (52) and the power amplifier (71) are disposed in the recess (200). The low noise amplifier (81) is disposed on the second main surface (2b) at a position not overlapping with the power amplifier (71) in plan view in the thickness direction (first direction D1) of the mounting substrate (2).

According to this configuration, isolation at the time of transmission and reception can be improved.

In the radio frequency module (1; 1A; 1B; 1C) according to a thirteenth aspect, in the second aspect, the mounting substrate (2; 2A; 2B; 2C) is provided with a through electrode (for example, the via conductor 91; 91a to 91d) that is used as a ground potential in the thickness direction (first direction D1). The through electrode is disposed between the recess (200; 201; 202; 203; 204; 210; 211; 212; 213) and the power amplifier (71) or the low noise amplifier (81) in plan view in the thickness direction (first direction D1) with respect to the mounting substrate (2; 2A; 2B).

According to this configuration, the through electrode being used as the ground potential is disposed between the recess (200; 201; 202; 203; 204; 210; 211; 212; 213) and the power amplifier (71) or the low noise amplifier (81) in plan view in the thickness direction. Thus, the through electrode functions as a shield between the chip inductor provided in the recess (200; 201; 202; 203; 204) and the power amplifier (71) or the low noise amplifier (81). As a result, it is possible to improve the isolation characteristics between the chip inductor provided in the recess (200; 201; 202; 203; 204; 210; 211; 212; 213) and the power amplifier (71) or the low noise amplifier (81).

In the radio frequency module (1A; 1B) according to a fourteenth aspect, in the second aspect, the mounting substrate (2A; 2B) has the first main surface (2a) and the second main surface (2b) that are opposed to each other. The recess (201; 202; 203; 204) is provided with respect to the second main surface (2b). The power amplifier (71) or the low noise amplifier (81) is provided on the second main surface (2b). The second chip inductor (52) or the third chip inductor (61; 62) is disposed in the recess (201; 202; 203; 204). A conductor pillar (90a to 90d) being used as a ground potential is provided on the second main surface (2b). The conductor pillar (90a to 90d) is disposed between the recess (201; 202; 203; 204) and the power amplifier (71) or the low noise amplifier (81) in plan view in the thickness direction (the first direction D1) with respect to the mounting substrate (2A; 2B).

According to this configuration, the conductor pillar (90a to 90d) being used as the ground potential is disposed between the recess (201; 202; 203; 204) and the power amplifier (71) or the low noise amplifier (81) in plan view in the thickness direction. Thus, the conductor pillar (90a to 90d) functions as a shield between the chip inductor provided in the recess (201; 202; 203; 204) and the low noise amplifier (81). As a result, the isolation between the chip inductor provided in the recess (201; 202; 203; 204) and the power amplifier (71) or the low noise amplifier (81) can be improved.

A communication device (500) according to a fifteenth aspect includes the radio frequency module (1; LA; 1B; 1C) according to any one of the first to fourteenth aspects and a signal processing circuit (3). The signal processing circuit (3) processes a signal passing through the radio frequency module (1; LA; 1B; 1C).

According to this configuration, it is possible to reduce the height of the communication device (500), particularly the radio frequency module (1; LA; 1B).

REFERENCE SIGNS LIST

1, LA, 1B, 1C RADIO FREQUENCY MODULE
2, 2A, 2B, 2C MOUNTING SUBSTRATE
2a FIRST MAIN SURFACE
2b SECOND MAIN SURFACE
2c, 2d, 2e, 2f, 2g, 220, 221, 222, 223 SURFACE
3 SIGNAL PROCESSING CIRCUIT
4 ANTENNA
5 RF SIGNAL PROCESSING CIRCUIT
6 BASEBAND SIGNAL PROCESSING CIRCUIT
7 FIRST RESIN LAYER
8 SECOND RESIN LAYER
10, 10B ANTENNA SWITCH
11 COMMON TERMINAL
11a FIRST COMMON TERMINAL
11b SECOND COMMON TERMINAL
12 FIRST SELECTION TERMINAL
13 SECOND SELECTION TERMINAL
14 THIRD SELECTION TERMINAL
20 FIRST MATCHING CIRCUIT UNIT
21, 22, 23 FIRST CHIP INDUCTOR (CHIP INDUCTOR)
30 FILTER GROUP
31, 32, 33 FILTER
40 SWITCH UNIT
41 FIRST SWITCH
42 COMMON TERMINAL
43a, 43b, 43c SELECTION TERMINAL
45 SECOND SWITCH
46 COMMON TERMINAL
47a, 47b, 47c SELECTION TERMINAL
50 SECOND MATCHING CIRCUIT UNIT
51 INDUCTOR
52 SECOND CHIP INDUCTOR (INDUCTOR)
53, 54, 55 CAPACITOR
60 THIRD MATCHING CIRCUIT UNIT
61, 62 THIRD CHIP INDUCTOR (CHIP INDUCTOR)
70 FIRST AMPLIFICATION UNIT
71 POWER AMPLIFIER
72 OUTPUT TERMINAL
73 INPUT TERMINAL
80 SECOND AMPLIFICATION UNIT
81 LOW NOISE AMPLIFIER
82 INPUT TERMINAL
83 OUTPUT TERMINAL

90 EXTERNAL CONNECTION ELECTRODE
90a, 90b, 90c, 90d CONDUCTOR PILLAR
91, 91a, 92b, 92c, 92d VIA CONDUCTOR
100 DIPLEXER
101 LOW PASS FILTER
102 HIGH PASS FILTER
105 FIRST TERMINAL
106 SECOND TERMINAL
107 THIRD TERMINAL
200, 201, 202, 203, 204, 210, 211, 212, 213 RECESS
500 COMMUNICATION DEVICE
800 SWITCH IC
900 EXTERNAL CONNECTION ELECTRODE
1000, 1100 MOTHER SUBSTRATE
1001, 1002, 1101, 1102 MOUNTING SUBSTRATE
1010 to 1015, 1020 to 1025, 1110 to 1115, 1120 to 1125 CUTTING POSITION
1131, 1132 END PORTION
T1 ANTENNA TERMINAL
D1 FIRST DIRECTION (THICKNESS DIRECTION)
D2 SECOND DIRECTION
D3 THIRD DIRECTION

The invention claimed is:

1. A radio frequency module comprising:
a mounting substrate; and
a power amplifier configured to amplify a transmission signal supplied to an antenna terminal; and
a low noise amplifier configured to amplify a reception signal received from the antenna terminal,
a plurality of chip inductors,
wherein the mounting substrate has a recess at one or both ends of the mounting substrate in a direction orthogonal to a thickness direction of the mounting substrate,
wherein the plurality of chip inductors comprises:
  a first chip inductor connected to the antenna terminal,
  a second chip inductor connected to an output side of the power amplifier, and
  a third chip inductor connected to an input side of the low noise amplifier,
wherein at least one of the first chip inductor, the second chip inductor, or the third chip inductor is in the recess.

2. The radio frequency module according to claim 1, wherein the second chip inductor is in the recess, and the low noise amplifier is not in the recess.

3. The radio frequency module according to claim 2, wherein:
the mounting substrate has a first main surface and a second main surface that are opposed to each other,
an external connection electrode is on the second main surface,
the recess is on the second main surface, and
the low noise amplifier is on the second main surface.

4. The radio frequency module according to claim 1, wherein the second chip inductor is in the recess, and wherein the first chip inductor or the third chip inductor is not in the recess.

5. The radio frequency module according to claim 1, wherein the third chip inductor is in the recess, and wherein the power amplifier is not in the recess.

6. The radio frequency module according to claim 1, wherein the third chip inductor is in the recess, and wherein the first chip inductor or the second chip inductor is not in the recess.

7. The radio frequency module according to claim 5, wherein:
the mounting substrate has a first main surface and a second main surface that are opposed to each other,
an external connection electrode is on the second main surface,
the recess is on the second main surface, and
the power amplifier is on the first main surface.

8. The radio frequency module according to claim 1, wherein:
the mounting substrate has the recess at both ends in the direction orthogonal to the thickness direction,
the first chip inductor, the second chip inductor, or the third chip inductor is in the recess at a first end of the both ends, and
another of the first chip inductor, the second chip inductor, or the third chip inductor is in the recess at a second end of the both ends.

9. The radio frequency module according to claim 8, wherein the second chip inductor is in the recess at the first end, and
wherein the first chip inductor and the third chip inductor are in the recess at the second end.

10. The radio frequency module according to claim 1, wherein the first chip inductor, the second chip inductor, or the third chip inductor is in the recess,
wherein another of the first chip inductor, the second chip inductor, or the third chip inductor is not in the recess, and
wherein a height of the chip inductor in the recess is greater than a height of the chip inductor not in the recess.

11. The radio frequency module according to claim 1, wherein:
the mounting substrate has a first main surface and a second main surface that are opposed to each other,
an external connection electrode is on the second main surface,
the recess is on the first main surface,
the second chip inductor and the power amplifier are in the recess,
the low noise amplifier is on the second main surface, and
in plan view of the mounting substrate in the thickness direction of the mounting substrate, the second chip inductor does not overlap the power amplifier.

12. The radio frequency module according to claim 1, wherein the mounting substrate further has a through electrode in the thickness direction, the through electrode having a ground potential, and
wherein in plan view of the mounting substrate in the thickness direction, the through electrode is between the recess and the power amplifier or the low noise amplifier.

13. The radio frequency module according to claim 1, wherein:
the mounting substrate has a first main surface and a second main surface that are opposed to each other,
the recess is on the second main surface,
the power amplifier or the low noise amplifier is on the second main surface,
the second chip inductor or the third chip inductor is in the recess,
a conductor pillar having a ground potential is on the second main surface, and
in plan view of the mounting substrate in the thickness direction, the conductor pillar is between the recess and the power amplifier or the low noise amplifier.

14. A communication device comprising:
the radio frequency module according to claim 1; and a signal processing circuit configured to process a signal passing through the radio frequency module.

\* \* \* \* \*